United States Patent
Kinpara et al.

(10) Patent No.: US 8,957,562 B2
(45) Date of Patent: Feb. 17, 2015

(54) STATOR HAVING CONDUCTORS THAT ARE OVERLAPPED WITH EACH OTHER AT JOINT PORTIONS IN A CIRCUMFERENTIAL DIRECTION, MOTOR HAVING THE STATOR, METHOD FOR MANUFACTURING THE CONDUCTORS AND METHOD FOR MANUFACTURING THE STATOR

(75) Inventors: Yoshimasa Kinpara, Toyohashi (JP); Noriyasu Nishio, Kosai (JP); Teruhisa Tateiwa, Tahara (JP); Takenobu Kawakami, Toyohashi (JP)

(73) Assignee: Asmo Co., Ltd., Kosai-shi (JP)

( * ) Notice: Subject to any disclaimer, the term of this patent is extended or adjusted under 35 U.S.C. 154(b) by 255 days.

(21) Appl. No.: 13/526,051

(22) Filed: Jun. 18, 2012

(65) Prior Publication Data

US 2012/0326551 A1 Dec. 27, 2012

(30) Foreign Application Priority Data

Jun. 24, 2011 (JP) .................................. 2011-140773

(51) Int. Cl.
*H02K 3/14* (2006.01)
*H02K 3/12* (2006.01)
*H02K 15/04* (2006.01)
*H02K 3/28* (2006.01)

(52) U.S. Cl.
CPC .............. *H02K 3/12* (2013.01); *H02K 15/0421* (2013.01)

USPC ........................................... 310/180; 310/201

(58) Field of Classification Search
CPC ............. H02K 3/14; H02K 3/04; H02K 3/12; H02K 3/28
USPC .................................. 310/180, 181–205, 260
See application file for complete search history.

(56) References Cited

U.S. PATENT DOCUMENTS

| | | | |
|---|---|---|---|
| 2003/0011268 A1* | 1/2003 | Even et al. ..................... | 310/179 |
| 2008/0007133 A1* | 1/2008 | Onimaru et al. ............... | 310/196 |
| 2010/0308680 A1* | 12/2010 | Yamada et al. .......... | 310/156.54 |
| 2011/0309707 A1* | 12/2011 | Kato et al. ............... | 310/156.54 |

FOREIGN PATENT DOCUMENTS

JP 11-98788 4/1999

* cited by examiner

*Primary Examiner* — Michael Andrews
(74) *Attorney, Agent, or Firm* — Christensen Fonder PA

(57) ABSTRACT

A stator includes a core having a plurality of slots and a plurality of U-shaped conductors, which are inserted in the corresponding slots. Each of the conductors has a pair of legs and a joint portion that connects the legs together. Each slot receives four legs and each of the legs in the slot is one leg of the corresponding one of the conductors. Two of the four conductors corresponding to the four legs inserted in each slot are overlapped with each other at the joint portions as viewed at least circumferentially.

10 Claims, 21 Drawing Sheets

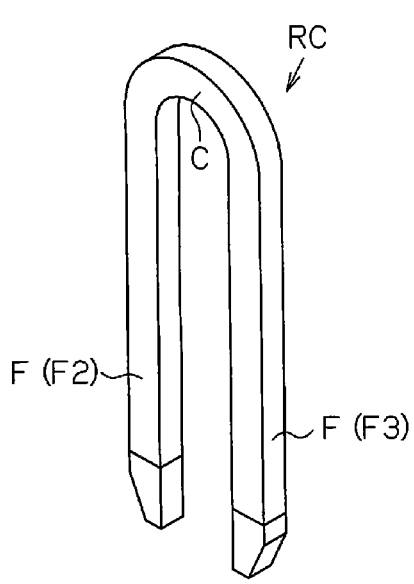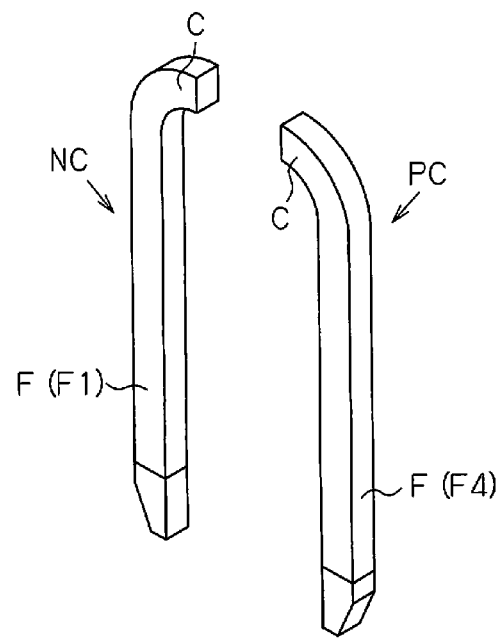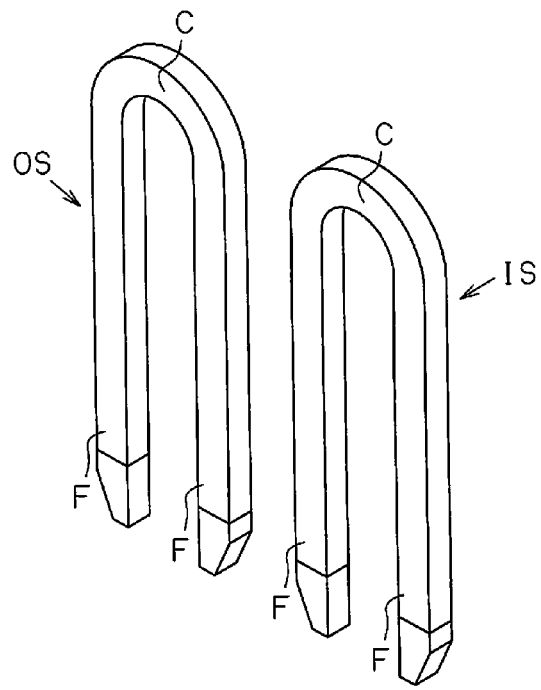

STATOR HAVING CONDUCTORS THAT ARE OVERLAPPED WITH EACH OTHER AT JOINT PORTIONS IN A CIRCUMFERENTIAL DIRECTION, MOTOR HAVING THE STATOR, METHOD FOR MANUFACTURING THE CONDUCTORS AND METHOD FOR MANUFACTURING THE STATOR

BACKGROUND OF THE INVENTION

The present invention relates to a stator, a motor, a method for manufacturing a conductor, and a method for manufacturing the motor.

Conventionally, various types of motors having a number of slots arranged circumferentially in a stator in correspondence with every magnetic pole of a rotor and SC (segment conductor) coils mounted in the slots have been proposed as a motor, such as a brushless motor. See, for example, Japanese Laid-Open Patent Publication No. 11-98788. In a motor described in this document, the number of slots per magnetic pole of a rotor is increased to decrease cogging torque and increase the occupancy rate of the coil in each of the slots. This reduces the size of the motor per unit of output.

An SC coil of a stator disclosed in the aforementioned document is a conductor segment (a coil segment) configured by two types of U-shaped conductive wires, each of which includes two legs and a joint portion for joining the legs together. The SC coils are axially arranged in the corresponding slots, which are formed in a stator core. Each adjacent pair of the legs of the SC coils are then welded and joined to each other in a step performed later, thus forming a coil that extends continuously in a circumferential direction.

Each one of the two types of the U-shaped conductive wires, which configure every segment conductor, is formed by bending a conductive wire in a U shape about a middle portion of the conductive wire. In other words, the arcuately bent portion corresponds to the joint portion and the portions extended from the opposite ends of the joint portion correspond to the legs. Then, the segment conductor is formed by arranging the second U-shaped conductive wire in the space formed by the inner surface of the joint portion and the inner surfaces of the legs of the first U-shaped conductive wire.

As has been described, the segment conductor is configured by the first U-shaped conductive wire wrapped around the second U-shaped conductive wire. Accordingly, the segment conductor has a laminated structure in which the joint portion of the first U-shaped conductive wire and the joint portion of the second U-shaped conductive wire are laminated with each other in the axial direction. As a result, a coil end becomes axially projected by the amount corresponding to the laminated joint portions of the first and second U-shaped conductive wires. This increases the total axial length of the stator and thus the size of the motor.

SUMMARY OF THE INVENTION

Accordingly, it is an objective of the present invention to provide a stator, a motor, a method for manufacturing a conductor, and a method for manufacturing the stator that are capable of decreasing the axial length of the stator and reducing the size of the motor.

To achieve the foregoing objective and in accordance with a first aspect of the present invention, a stator including a core and a plurality of U-shaped conductors is provided. The core includes a cylindrical portion, a plurality of teeth, and an axis. The teeth are extended from the cylindrical portion toward the axis and spaced apart at equal intervals in a circumferential direction of the cylindrical portion. A plurality of slots are formed each of which is formed between an adjacent pair of the teeth and extending in the axial direction defined by the axis. The core has a first end at one end in the axial direction and a second end at the opposite end. Each conductor has a pair of legs and a joint portion for joining the legs together. The pair of legs is inserted in different ones of the slots of the core while being spaced apart at a predetermined slot pitch and a radial pitch. Each slot receives four legs. Each of the four legs is one leg of the corresponding one of the conductors. The four legs inserted in the slot are arranged in a laminated structure in which the legs are a first layer leg, a second layer leg, a third layer leg, and a fourth layer leg located consecutively from a radially inner side. The joint portions of the conductors are located at the side corresponding to the first end of the core. The distal ends of the legs of the conductors are arranged at the side corresponding to the second end of the core. Two of the four conductors corresponding to the legs inserted in one of the slots are overlapped with each other at the joint portions as viewed at least in the circumferential direction.

In accordance with a second aspect of the present invention, a motor having the stator of the first aspect is provided.

In accordance with a third aspect of the present invention, a method for manufacturing U-shaped conductors is provided. Two conductors are inserted in different ones of a plurality of slots formed in a stator. The stator includes a core and a plurality of U-shaped conductors. The core has a cylindrical portion, a plurality of teeth, and an axis. The teeth are extended from the cylindrical portion toward the axis and spaced apart at equal intervals in a circumferential direction of the cylindrical portion. A plurality of slots are provided each of which is formed between an adjacent pair of the teeth and extending in the axial direction defined by the axis. Each conductor has a pair of legs and a joint portion for joining the legs together. The pair of legs is inserted in different ones of the slots of the core while being spaced apart at a predetermined slot pitch and a radial pitch. The method includes: a bending step for bending, into a U shape, a cut section of a conductive wire having a predetermined length, the bent portion being the joint portion, the legs being formed at the opposite ends of the joint portion; an overlaying step for preparing two U-shaped conductive wire sections formed in the bending step and overlaying the joint portions of the two U-shaped conductive wire sections in a direction perpendicular to a plane defined by the corresponding two legs and aligning the legs of the two conductive wire sections linearly; and a twisting step for holding a middle portion of each of the joint portions of the two U-shaped conductive wire sections overlaid in the overlaying step and twisting the joint portions by moving a set of two legs located at one side and a set of the other two legs arranged at the opposite side with respect to the joint portions relative to each other in the different perpendicular directions.

In accordance with a fourth aspect of the present invention, a method for manufacturing a stator is provided. The method includes: a step for preparing a core having a cylindrical portion, a plurality of teeth, and an axis, the teeth being extended from the cylindrical portion toward the axis and spaced apart at equal intervals in a circumferential direction of the cylindrical portion, a plurality of slots each being formed between an adjacent pair of the teeth and extending in the axial direction defined by the axis, the core having a first end at one side in the axial direction and a second end at the opposite side; a step for preparing a plurality of U-shaped conductors each having a pair of legs and a joint portion for joining the legs together; a segment forming step for forming a segment by radially overlaying the joint portions of two of the conductors such that a set of two legs located at one side and a set of the other two legs arranged at the opposite side with respect to the joint portions become circumferentially spaced from each other in different directions; an inserting step for each of the segments formed by repeatedly performing the segment forming step, the insertion step including inserting the set of two legs at one side and the set of the other two legs at the opposite side in different ones of the slots, each slot receiving four legs, each of the four legs being one leg of the corresponding one of the conductors, the four legs inserted in the slot being arranged in a laminated structure in which the legs are a first layer leg, a second layer leg, a third layer leg, and a fourth layer leg located consecutively from a radially inner side, the joint portions of the conductors being arranged at the side corresponding to the first end of the core, the distal ends of the legs of the conductors being located at the side corresponding to the second end of the core; and a joining step for circumferentially bending the distal end of the portion of each leg of the respective sets of each segment inserted in the corresponding slot in the inserting step that is projected axially from the slot and joining the bent portion with the distal end of the corresponding leg of the radially adjacent one of the segments.

BRIEF DESCRIPTION OF THE DRAWINGS

FIG. 5A is a perspective view showing an inversion segment;

FIG. 5B is a perspective view showing a feeding segment;

FIG. 6 is a perspective view showing an inner conductor and an outer conductor before formation of a recess;

DETAILED DESCRIPTION OF THE PREFERRED EMBODIMENTS (First Embodiment)

A first embodiment of a brushless motor according to the present invention will now be described with reference to FIGS. 1 to 19.

Figure 1:
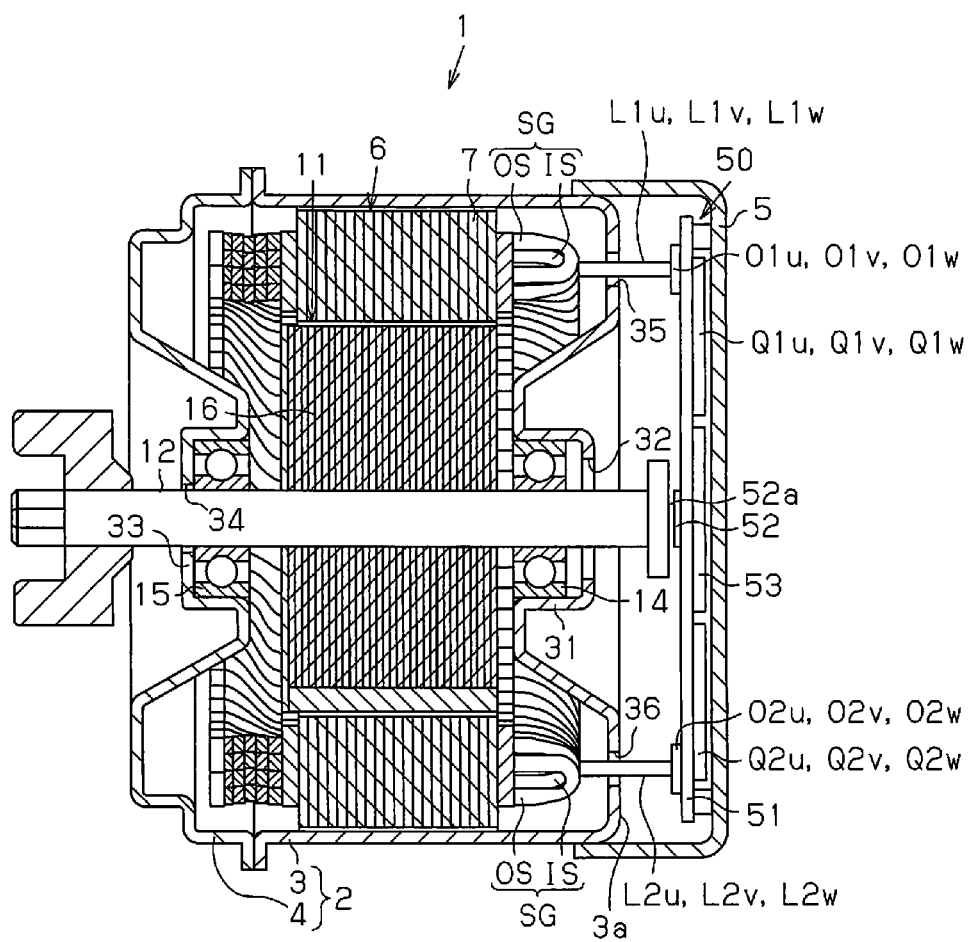
FIG. 1 is a cross-sectional view showing a brushless motor according to a first embodiment of the present invention.

As shown in FIG. 1, a motor case 2 of a brushless motor 1 includes a tubular housing 3 having a closed end and a front end plate 4 for closing a front opening (the left side as viewed in FIG. 1) of the tubular housing 3. An accommodation box 5 is attached to a rear end (the right side as viewed in FIG. 1) of the tubular housing 3.

Figure 2:
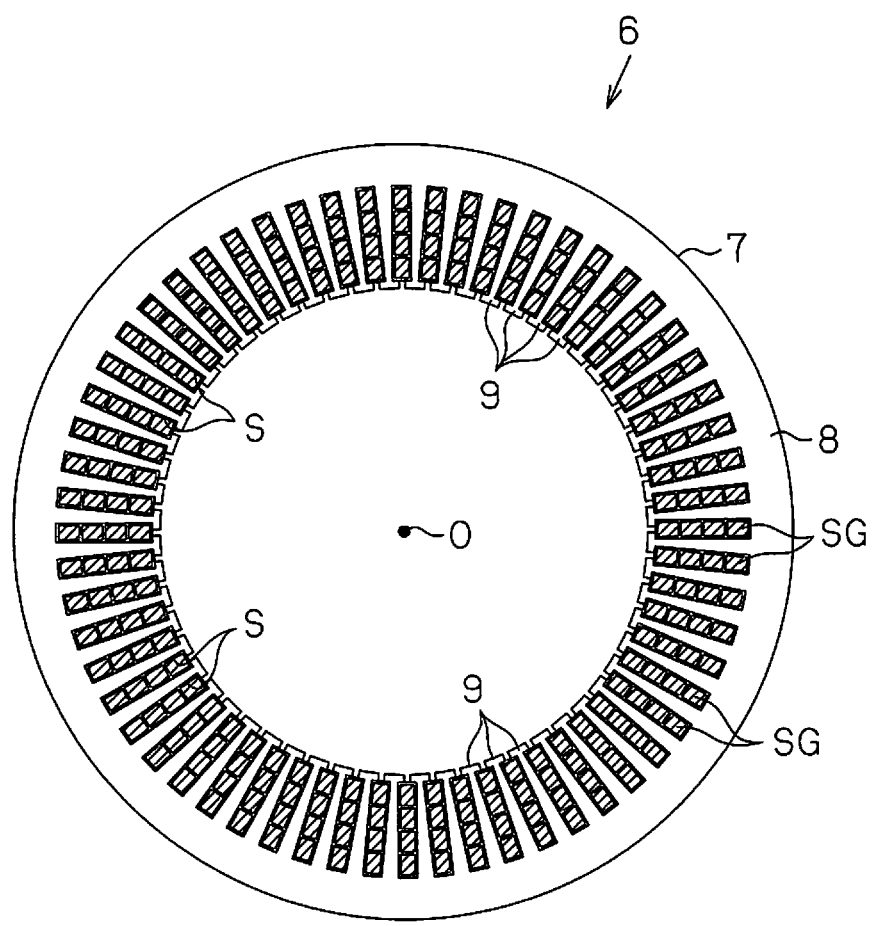
FIG. 2 is a cross-sectional view showing a stator of the first embodiment.

A stator 6 serving as an armature is fixed to the inner peripheral surface of the tubular housing 3. Referring to FIG. 2, the stator 6 has a stator core 7. The stator core 7 includes a cylindrical portion 8 and a plurality of teeth 9 extending radially inward from the cylindrical portion 8. The teeth 9 are arranged in a circumferential direction of the cylindrical portion 8 and spaced apart at equal intervals.

In the first embodiment, sixty teeth 9 are employed. Sixty slots S are thus formed each between an adjacent pair of the teeth 9. The slots S are spaced apart at equal angular intervals, each of which is 6 degrees about the axis O of the cylindrical portion 8 (the stator core 7). For illustrative purposes, when it is necessary to specify the respective slots S, the sixty slots S are mentioned with slot numbers 1 to 60, which are consecutive in a circumferential direction, or, in other words, a clockwise direction as viewed from the rear side of the stator core 7.

Figure 3:
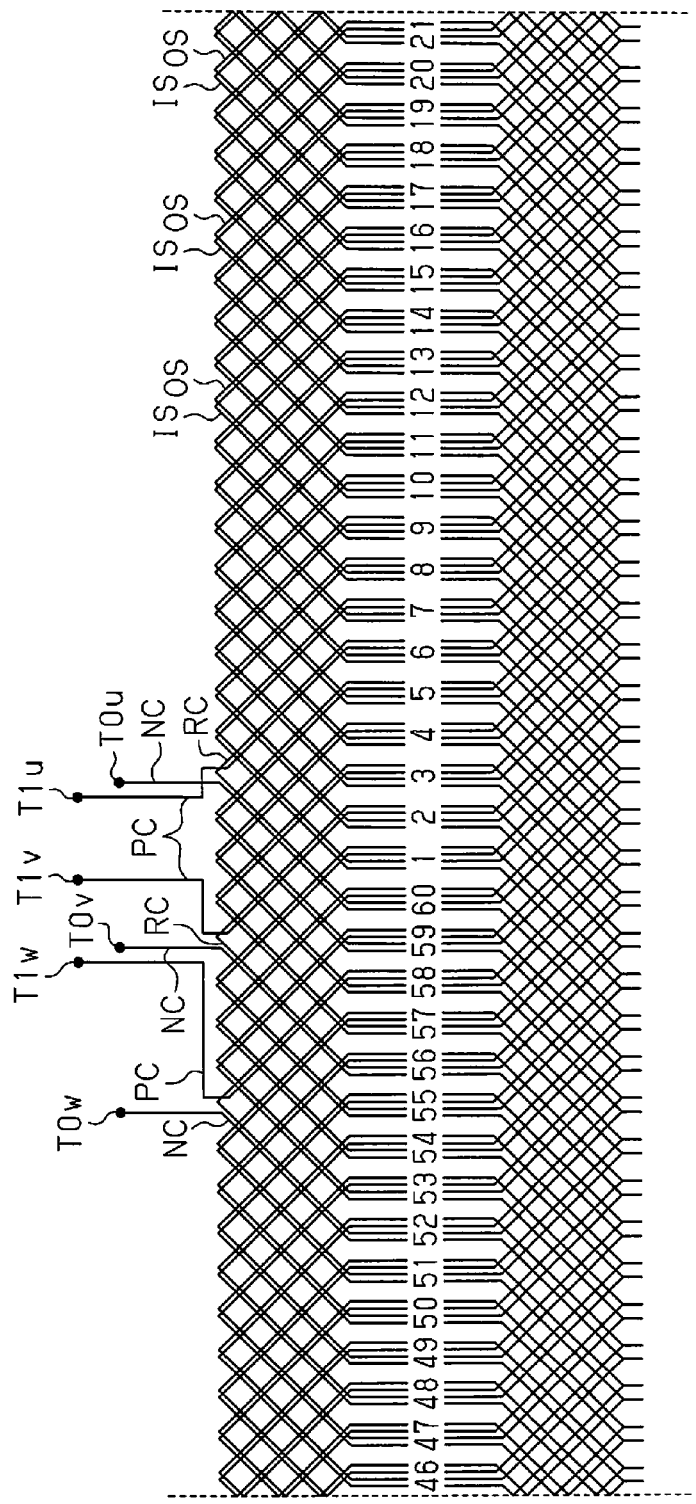
FIG. 3 is a developed view showing portions of three-phase coils of the first embodiment.
Figure 4:
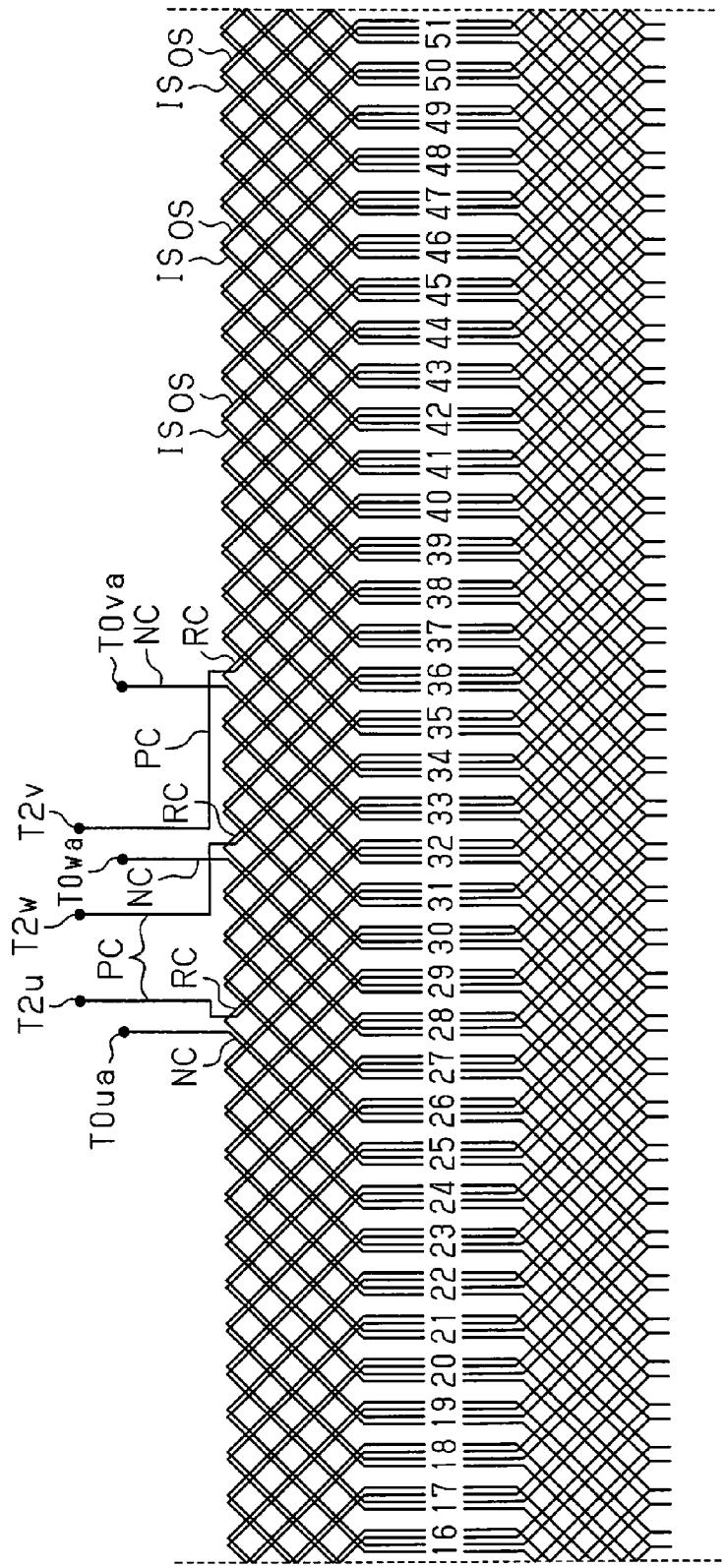
FIG. 4 is a developed view showing the portions of the three-phase coils of the first embodiment.

As shown in FIGS. 3 and 4, coils of three phases, which are a U phase, a V phase, and a W phase, are mounted in the slots S. In these drawings, the slot numbers 1 to 60 for the slots S, which are applied consecutively in a circumferential direction, are shown in a developed manner as viewed from above.

Segments are inserted into each slot S from one axial side (the rear side) to the other axial side (the front side) and connected together in a predetermined regular manner to form the wiring wires of the respective phases. The segments received in the slots S include inversion conductors RC, feeding conductors PC, common conductors NC, and coil segments (segment conductors) SC.

As illustrated in FIG. 5A, each of the inversion conductors RC is a conductor formed by bending a conductive wire having a rectangular cross section in an arcuate shape. The arcuately bent portion corresponds to a joint portion C and the portions extending from the opposite ends of the bent joint portion C correspond to legs F. The two legs F, which extend from the opposite ends of the joint portion C, are a second layer leg F2 and a third layer leg F3.

With reference to FIG. 5B, each of the feeding conductors PC and each of the common conductors NC are formed by dividing the inversion conductor RC at a middle portion of the joint portion C. Specifically, each feeding conductor PC and each common conductor NC are conductors each configured by a semi-arcuate joint portion C, which is a divided half of the joint portion C, and the corresponding one of the legs F. The leg F of the feeding conductor PC is referred to as a fourth layer leg F4 and the leg F of the common conductor NC is referred to as a first layer leg F1.

Figure 8A:
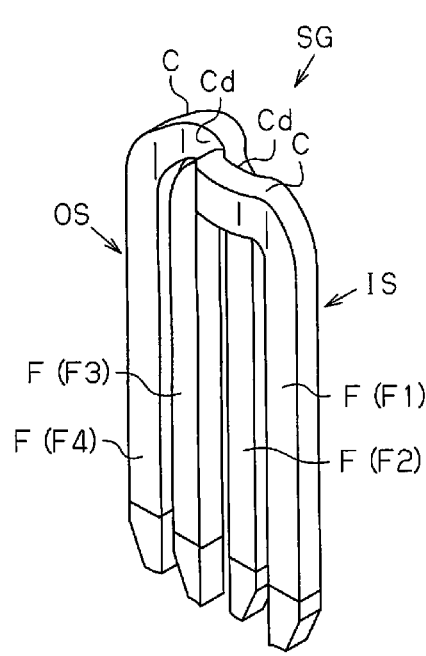
FIG. 8A is a perspective view showing a coil segment with an inner conductor and an outer conductor held in an overlaid state.
Figure 8B:
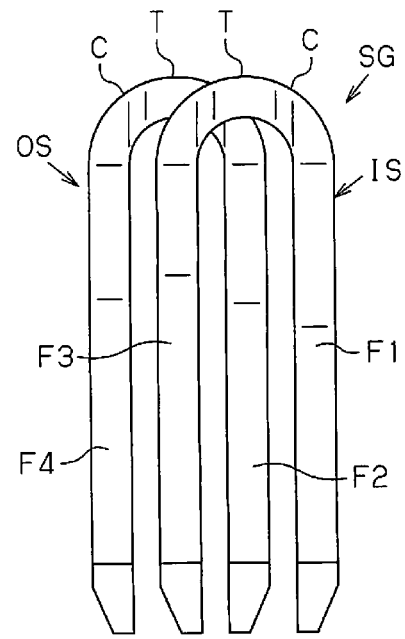
FIG. 8B is a front view showing the inner conductor and the outer conductor held in the overlaid state.
Figure 8C:
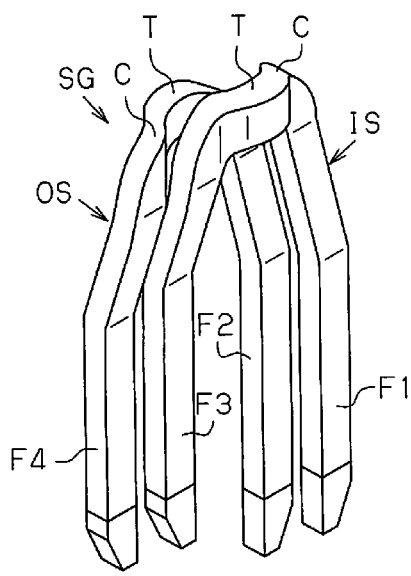
FIG. 8C is a view illustrating the inner conductor and the outer conductor after twisting.
Figure 8D:
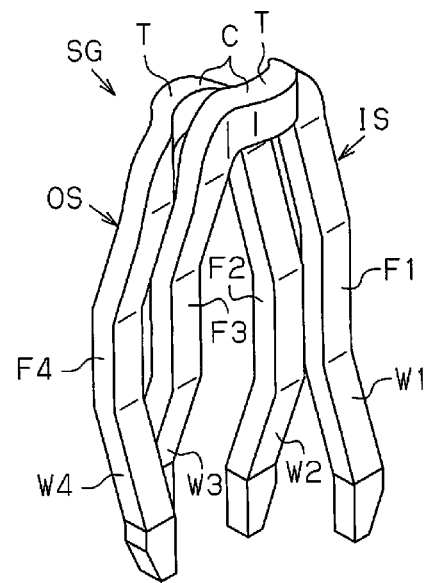
FIG. 8D is a perspective view showing the inner conductor and the outer conductor configuring the coil segment each in a bent state.
Figure 9:
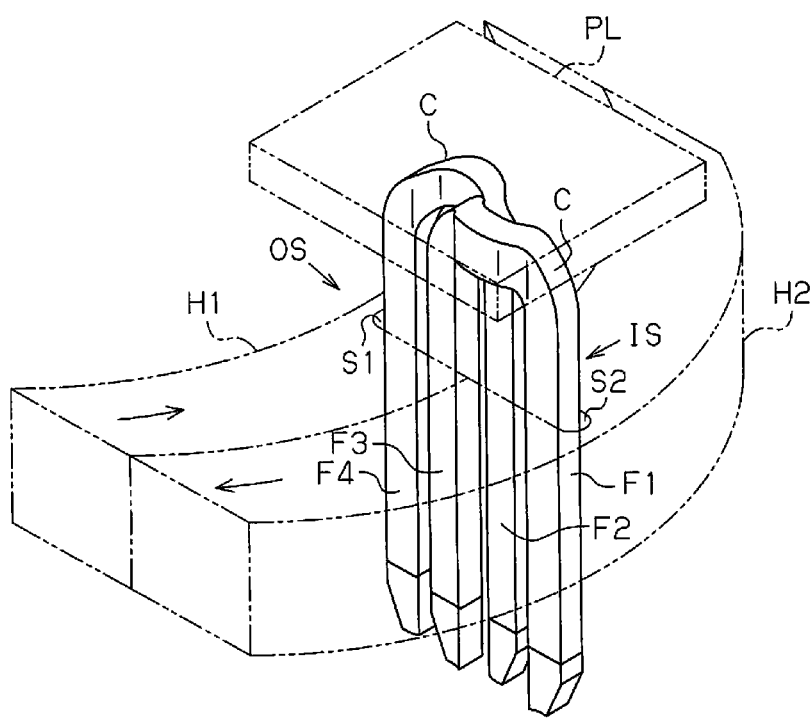
FIG. 9 is a view illustrating twisting of the coil segment with the inner conductor and the outer conductor held in the overlaid state.

As illustrated in FIGS. 8 and 9, each of the coil segments SG is configured by an inner conductor IS and an outer conductor OS.

With reference to FIG. 6, the inner conductor IS and the outer conductor OS of each coil segment SG are identical U-shaped conductors. The inner and outer conductors IS, OS are formed by cutting a long conductive wire formed of copper by a predetermined length and bending the cut section of the conductive wire each in an arcuate shape about a middle portion of the section (in a U shape bending step). In each of the inner and outer conductors IS, OS, which are bent and formed in a U shape, the arcuately bent portion corresponds to the joint portion C and the portions extending from the opposite ends of the bent joint portion C correspond to the legs F.

Specifically, the inner conductor IS and the outer conductor OS, which have been formed in the above-described manner, are shaped identically with each inversion conductor RC illustrated in FIG. 5A at this stage and may thus be employed as the inversion conductor RC. Also, if the inner conductor IS and the outer conductor OS are each divided into two portions at the middle portion of the joint portion C at this stage, the obtained portions correspond to the feeding conductors PC and the common conductors NC, as shown in FIG. 5B.

Figure 7:
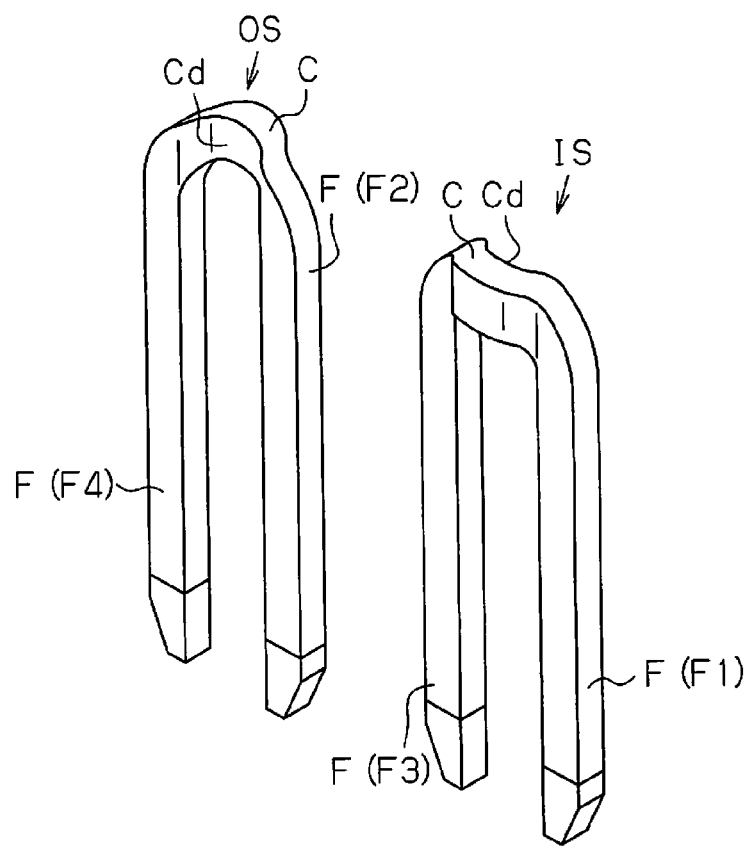
FIG. 7 is a perspective view showing the inner conductor and the outer conductor before formation of a recess.

Subsequently, as illustrated in FIG. 7, a recess Cd is formed in each of the inner and outer conductors IS, OS, which have been curbed in the U shapes as shown in FIG. 6, through bending with a press. The recess Cd is formed in a middle portion of one side of the joint portion C and dented in a circumferential direction, which is a direction perpendicular to a plane extending on the two legs F (a perpendicular direction). Alternatively, the recesses Cd may be formed through compression. Each of the recess Cd is shaped, as viewed circumferentially, such that the wall of the recess Cd is engaged with a radial half of the adjacent joint portion C.

Then, the inner conductor IS and the outer conductor OS, each of which includes the recess Cd, are arranged such that the recesses Cd face each other. The wall of the recess Cd of the outer conductor OS is thus engaged with the wall of the recess Cd formed in the joint portion C of the inner conductor IS. As a result, a coil segment SG before insertion into corresponding slots S is formed (a segment forming step or an overlaying step). At this stage, with reference to FIG. 8A, in the inner conductor IS and the outer conductor OS, the joint portions C are engaged and overlapped with each other at the recesses Cd. The two legs F of the inner conductor IS and the two legs F of the outer conductor OS are aligned linearly in a radial direction.

In this state, the joint portions C of the inner and outer conductors IS, OS are not overlapped with each other in the axial direction. As a result, as illustrated in FIGS. 8B and 8C, tops T of the joint portions C of the inner and outer conductors IS, OS are aligned in the axial direction and the distal ends of the legs F of the inner and outer conductors IS, OS are aligned.

In each coil segment SG before insertion into the corresponding slots S, the radially inner one of the two legs F of the inner conductor IS is referred to as a first layer leg F1 and the radially outer one of the legs F is referred to as a third layer leg F3. The radially inner one of the two legs F of the outer conductor OS is referred to as a second layer leg F2 and the radially outer one of the legs F is referred to as a fourth layer leg F4.

Subsequently, with the first to fourth layer legs F1 to F4 of the coil segment SG aligned linearly in a radial direction as illustrated in FIG. 8A, a set of the first and second layer legs F1, F2 and a set of the third and fourth layer legs F3, F4 are inserted in the corresponding slots S by an interval corresponding to six slot pitches.

Since the set of the first and second layer legs F1, F2 inserted in the corresponding slot S are spaced from the set of the third and fourth layer legs F3, F4 by the interval corresponding to the six slot pitches, the coil segment SG in the state illustrated in FIG. 8A is twisted.

The coil segment SG in the state of FIG. 8A is twisted by moving the first and second layer legs F1, F2 and the third and fourth layer legs F3, F4 in different directions perpendicular to the plane extending on the legs F, with the tops T of the joint portions C of the inner and outer conductors IS, OS maintained at the same height.

Specifically, as illustrated in FIG. 9, a restriction plate PL, a first holding jig H1, and a second holding jig H2 are employed. The restriction plate PL has a surface perpendicular to the plane extending on the legs F. The first holding jig H1 has a first slot S1 through which the first and second layer legs F1, F2 are radially inserted. An outer radial surface of the first holding jig H1 is arranged between the leg F2 and the leg F3. The second holding jig H2 has an inner radial surface slidable on the outer radial surface of the first holding jig H1. The second holding jig H2 has a second slot S2 through which the third and fourth layer legs F3, F4 are inserted radially.

The tops T of the joint portions C of the inner conductor IS and the outer conductor OS are held in contact with the perpendicular surface of the restriction plate PL. The first and second layer legs F1, F2 are passed through the first slot S1 of the first holding jig H1. The third and fourth layer legs F3, F4 are inserted through the second slot S2 of the second holding jig H2. In this state, the first holding jig H1 and the second holding jig H2 are moved in a counterclockwise direction and a clockwise direction, respectively, as indicated in FIG. 9, thus twisting the inner conductor IS and the outer conductor OS.

Alternatively, the first holding jig H1 may be maintained in a fixed state and the second holding jig H2, solely, may be slid in the clockwise direction.

Through twisting using the restriction plate PL and the first and second holding jigs H1, H2, the joint portions C, the first and second layer legs F1, F2, and the third and fourth layer legs F3, F4 are deformed. Accordingly, as illustrated in FIG. 8C, the interval between the set of the first and second layer legs F1, F2 and the set of the third and fourth layer legs F3, F4 is enlarged to the size corresponding to the six slot pitches in a circumferential direction. As a result, referring to FIG. 8C, twisting is accomplished such that the first layer leg F1 and the second layer leg F2 are aligned linearly in a radial direction and the third layer leg F3 and the fourth layer leg F4 are aligned linearly in a radial direction.

Then, the set of the first and second layer legs F1, F2 and the set of the third and fourth layer legs F3, F4 are inserted in the corresponding slots S while maintained in a state where one of the sets is spaced from the other by the interval corresponding to the six slot pitches (an inserting step). Specifically, the twisted inner and outer conductors IS, OS are inserted into the slots S in a state where the tops T of the joint portions C of the inner and outer conductors IS, OS receive load acting in the inserting direction through the restriction plate PL (see FIG. 9). This equalizes the heights of the coil ends in the joint portions C of the inner and outer conductors IS, OS.

In the coil segment SG inserted in the above-described manner, the set of the first and second layer legs F1, F2 are received in a common slot S and the set of the third and fourth layer legs F3, F4 are arranged in a common slot S spaced from the slot S for the set of the first and second layer legs F1, F2 by the interval corresponding to the six slot pitches.

For example, the set of the first and second layer legs F1, F2 of the inner and outer conductors IS, OS are inserted in the slot S of slot number 6, the set of the third and fourth layer legs F3, F4 are received in the slot S of slot number 12. In other words, in each coil segment SG, the set of the first and second layer legs F1, F2 are spaced from the set of the third and fourth layer legs F3, F4 by the interval corresponding to the six slot pitches when inserted.

The slot S of slot number 12 in which the set of the third and fourth layer legs F3, F4 are inserted then receives the set of the first and second layer legs F1, F2 of the inner and outer conductors IS, OS of the corresponding adjacent one of the coil segments SG. The set of the third and fourth layer legs F3, F4 of the inner and outer conductors OS, IS of the adjacent coil segment SG are inserted in the slot S of slot number 18. Afterwards, the coil segments SG are inserted in the corresponding slots S consecutively using the above-described method until the third and fourth layer legs F3, F4 of the inner and outer conductors IS, OS of a ninth coil segment SG are inserted in the slot S of slot number 60 and the coil segments SG are arranged annularly. The nine coil segments SG, which are arranged in an annular shape, are then connected together to form a coil of one phase.

As a result, coils of six phrases are formed using the sixty slots S. In other words, two sets of coils of three phases (coils of three phases of a first system and coils of three phases of a second system), which are a U phase, a V phase, and a W phase, are formed. Hereinafter, to specify the respective ones of the coils of the three phases of the first system and the second system, the three phases of the coils of the first system will be referred to as a U1 phase, a V1 phase, and a W1 phase. The three phases of the coils of the second system will be referred to as a U2 phase, a V2 phase, and a W2 phase. An insulator 10 (see FIG. 12) is formed on the inner peripheral surface of each of the slots S. The insulator 10 electrically insulates the associated coil segments SG from the stator core 7 of the stator 6.

In the first embodiment, the respective coils of the three phases of each of the first and second systems are received in the slots S as represented in Table 1.

| | | Slot numbers | | | | | | | | | |
|---|---|---|---|---|---|---|---|---|---|---|---|
| U Phase | First System U1 | 60 | 6 | 12 | 18 | 24 | 30 | 36 | 42 | 48 | 54 |
| | Second System U2 | 1 | 7 | 13 | 19 | 25 | 31 | 37 | 43 | 49 | 55 |
| V Phase | First System V1 | 2 | 8 | 14 | 20 | 26 | 32 | 38 | 44 | 50 | 56 |
| | Second System V2 | 3 | 9 | 15 | 21 | 27 | 33 | 39 | 45 | 51 | 57 |
| W Phase | First System W1 | 4 | 10 | 16 | 22 | 28 | 34 | 40 | 46 | 52 | 58 |
| | Second System W2 | 5 | 11 | 17 | 23 | 29 | 35 | 41 | 47 | 53 | 59 |

As is clear from Table 1, for the U1 phase of the coils of the three phases of the first system, the coil is mounted, or, in other words, the coil segments SG are inserted in the slots S of slot numbers 60, 6, 12, 18, 24, 30, 36, 42, 48, and 54. Specifically, as illustrated in FIG. 3, the inversion conductor RC for the U1 phase is received in the slots S of slot numbers 60 and 6, instead of the coil segment SG. Also, the slot S of slot number 6 receives the feeding conductor PC and the slot S of slot number 60 receives the common conductor NC.

For the V1 phase of the coils of the three phases of the first system, the coil is mounted, or, in other words, the coil segments SG are inserted in those of the slots S offset from the coils of the U1 phase of the first system by an interval corresponding to two slot pitches. Similarly, as illustrated in FIG. 3, the inversion conductor RC and the feeding conductor PC for the V1 phase are received in the slots S of slot numbers 56 and 2, instead of the coil segments SG. Also, the slot S of slot number 2 receives the feeding conductor PC and the slot S of slot number 56 receives the common conductor NC.

For the W1 phase of the coils of the three phases of the first system, the coil is mounted, or, in other words, the coil segments SG are inserted in those of the slots S offset from the coils of the U1 phase of the first system by an interval corresponding to four slot pitches. Similarly, as illustrated in FIG. 3, the inversion conductor RC for the W1 phase is received in the slots S of slot numbers 58 and 52, instead of the coil segment SG. Also, the slot S of slot number 58 receives the feeding conductor PC and the slot S of slot number 52 receives the common conductor NC.

For the U2 phase of the coils of the three phases of the second system, the coil is mounted, or, in other words, the coil segments SG are inserted in those of the slots S offset from the coils of the U1 phase of the first system by an interval corresponding to one slot pitch, which are the slots S of slot numbers 1, 7, 13, 19, 25, 31, 37, 43, 49, and 55. Specifically, as illustrated in FIG. 4, the inversion conductor RC for the U2 phase is received in the slots S of slot numbers 25 and 31, instead of the coil segment SG. Also, the slot S of slot number 31 receives the feeding conductor PC and the slot S of slot number 25 receives the common conductor NC.

For the V2 phase of the coils of the three phases of the second system, the coil is mounted, or, in other words, the coil segments SG are inserted in those of the slots S offset from the coils of the U2 phase of the second system by an interval corresponding to two slot pitches. Similarly, as illustrated in FIG. 4, the inversion conductor RC for the W2 phase is received in the slots S of slot numbers 33 and 39, instead of the coil segment SG. Also, the slot S of slot number 39 receives the feeding conductor PC and the slot S of slot number 33 receives the common conductor NC.

For the W2 phase of the coils of the three phases of the second system, the coil is mounted, or, in other words, the coil segments SG are inserted in those of the slots S offset from the coils of the U2 phase of the second system by an interval corresponding to four slot pitches. Similarly, as illustrated in FIG. 4, the inversion conductor RC for the V2 phase is received in the slots S of slot numbers 29 and 35, instead of the coil segment SG. Also, the slot S of slot number 35 receives the feeding conductor PC and the slot S of slot number 29 receives the common conductor NC.

After the coil segments SG, the inversion conductors RC, the feeding conductors PC, and the common conductors NC are inserted in the corresponding slots S in the above-described manner, the coil segments SG, the inversion conductors RC, the feeding conductors PC, and the common conductors NC are bent to form the coils of the respective phases.

Specifically, as illustrated in FIG. 8D, for the inner conductor IS of each coil segment SG, the portion of the first layer leg F1 and the portion of the third layer leg F3 projected from the corresponding slots S are bent in circumferential directions to be separated from each other. The portion of the first layer leg F1 and the portion of the third layer leg F3, which are projected from the slots S and bent in circumferential directions to be separated from each other, are referred to as a first welding portion W1 and a third welding portion W3, respectively.

In contrast, for the outer conductor OS of each coil segment SG, the portion of the second layer leg F2 and the portion of the fourth layer leg F4 projected from the corresponding slots S are bent in circumferential directions to be brought closer to each other. The portion of the second layer leg F2 and the portion of the fourth layer leg F4, which are projected from the slots S and bent in circumferential directions to be brought closer to each other, are referred to as a second welding portion W2 and a fourth welding portion W4, respectively.

Then, for the coil of the same phase, the third welding portion W3 of one of the segments SG is welded to the fourth welding portion W4 of the circumferentially adjacent one of the segments SG and the first welding portion W1 of one of the segments SG is welded to the second welding portion W2 of the circumferentially adjacent one of the segments SG (a joining step).

For each inversion conductor RC, the portion of the second layer leg F2 and the portion of the third layer leg F3 projected from the corresponding slots S are bent in the same circumferential direction. Specifically, the second layer leg F2 of the inversion conductor RC is bent in the same direction as the third layer leg F3 of the inner conductor IS. The third layer leg F3 of the inversion conductor RC is bent in the same direction as the second layer leg F2 of the outer conductor OS.

The portion of the second layer leg F2 and the portion of the third layer leg F3 of each inversion conductor RC projected from the corresponding slots S and bent in the same direction are referred to as the second welding portion W2 and the third welding portion W3, respectively.

The second welding portion W2 of the second layer leg F2 of the inversion conductor RC is welded to the first welding portion W1 of the first layer leg F1 of the inner conductor IS of the circumferentially adjacent one of the segments SG in the coil of the same phase. Also, the third welding portion W3 of the third layer leg F3 of the inversion conductor RC is welded to the first welding portion W1 of the first layer leg F1 of the inner conductor IS of the segment SG adjacent to the segment SG to which the second welding portion W2 has been welded in the coil segment SG.

The portion of the leg F of each feeding conductor PC projected from the corresponding slot S is bent in a direction separating from the third welding portion W3 of the inversion conductor RC.

The portion of the leg F of each common conductor NC projected from the corresponding slot S is bent in a direction separating from the second welding portion W2 of the inversion conductor RC.

(Three Phase Coils of First System)

The coils of the three phases of the first system will now be described.

A method for winding the coil of the U1 phase, which is one of the coils of the three phases of the first system, using an inversion conductor RC, a feeding conductor PC, a common conductor NC, and nine segments SG will hereafter be described with reference to FIGS. 10 and 11.

The slots S used for the coil of the U1 phase of the first system are the slots S of the slot numbers represented in Table 1. The inversion conductor RC, the feeding conductor PC, the common conductor NC, and the nine segments SG1 to SG9 are employed.

Specifically, the inversion conductor RC is inserted into the slots S of slot numbers 60 and 6. The slot S of slot number 60 receives the common conductor NC and the slot S of slot number 6 receives the feeding conductor PC.

A first segment SG1 is inserted in the slots S of slot numbers 6 and 12. A second segment SG2 is received in the slots S of slot numbers 12 and 18. A third segment SG3 is mounted in the slots S of slot numbers 18 and 24. A fourth segment SG4 is received in the slots S of slot numbers 24 and 30.

A fifth segment SG5 is inserted in the slots S of slot numbers 30 and 36. A sixth segment SG6 is received in the slots S of slot numbers 36 and 42. A seventh segment SG7 is mounted in the slots S of slot numbers 42 and 48. An eighth segment SG8 is inserted in the slots S of slot numbers 48 and 54. A ninth segment SG9 is mounted in the slots S of slot numbers 54 and 60.

Specifically, to insert the inversion conductor RC and the segments SG1 to SG9 in the corresponding slots S, the joint portions C of the inner and outer conductors IS, OS are twisted to facilitate insertion of a subsequent segment into predetermined slots S.

In this state, the slot S of slot number 60 receives the third layer leg F3 and the fourth layer leg F4 of the ninth segment SG9, the second layer leg F2 of the inversion conductor RC, and the first layer leg F1 of the common conductor NC. The slot S of slot number 6 receives the first layer leg F1 and the second layer leg F2 of the first segment SG, the third layer leg F3 of the inversion conductor RC, and the fourth layer leg F4 of the feeding conductor PC.

The slot S of slot number 12 receives the first coil segment SG1 for the U1 phase. The slot S of slot number 12 thus receives the third layer leg F3 and the fourth layer leg F4 of the first coil segment SG1. In this state, the slot S of slot number 12 receives the first and second layer legs F1, F2 of the second coil segments SG2.

Figure 12:
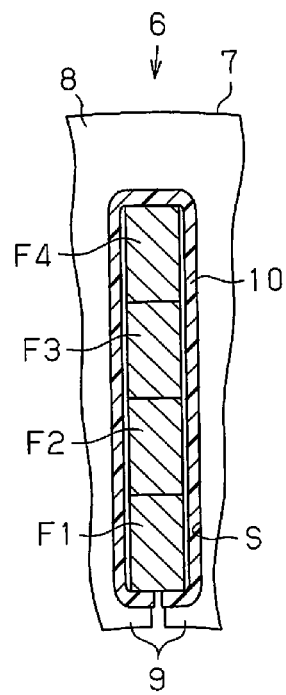
FIG. 12 is a cross-sectional view showing the conductors of each coil segment inserted in a slot.

In other words, as illustrated in FIG. 12, in the slot S, the first layer leg F1, the second layer leg F2, the third layer leg F3, and the fourth layer leg F4 are arranged consecutively from the radially inner side in a four layer structure (a radially laminated structure).

The fourth welding portion of the inversion conductor PC is welded to the third welding portion W3 of the third layer leg F3 of the ninth coil segment SG9 (the third layer leg F3 inserted in the slot number 60). The first welding portion of the common conductor NC is welded to the third welding portion W3 of the third layer leg F3 of the eighth coil segment SG8 (the third layer leg F3 inserted in the slot number 54).

The third welding portion of the feeding conductor RC is welded to the fourth welding portion W4 of the fourth layer leg F4 of the first coil segment SG1 (the fourth layer leg F4 inserted in the slot number 12). The second welding portion of the inversion conductor RC is welded to the first welding portion W1 of the first layer leg F1 of the first coil segment SG1 (the first layer leg F1 inserted in the slot number 6).

The second welding portion W2 of the first coil segment SG1 is welded to the first welding portion W1 of the first layer leg F1 of the second coil segment SG2 (the first layer leg F1 inserted in the slot number 12). The third welding portion W3 of the first coil segment SG1 is welded to the fourth welding portion W4 of the fourth layer leg F4 of the second coil segment SG2 (the fourth layer leg F4 inserted in the slot number 18).

Figure 10:
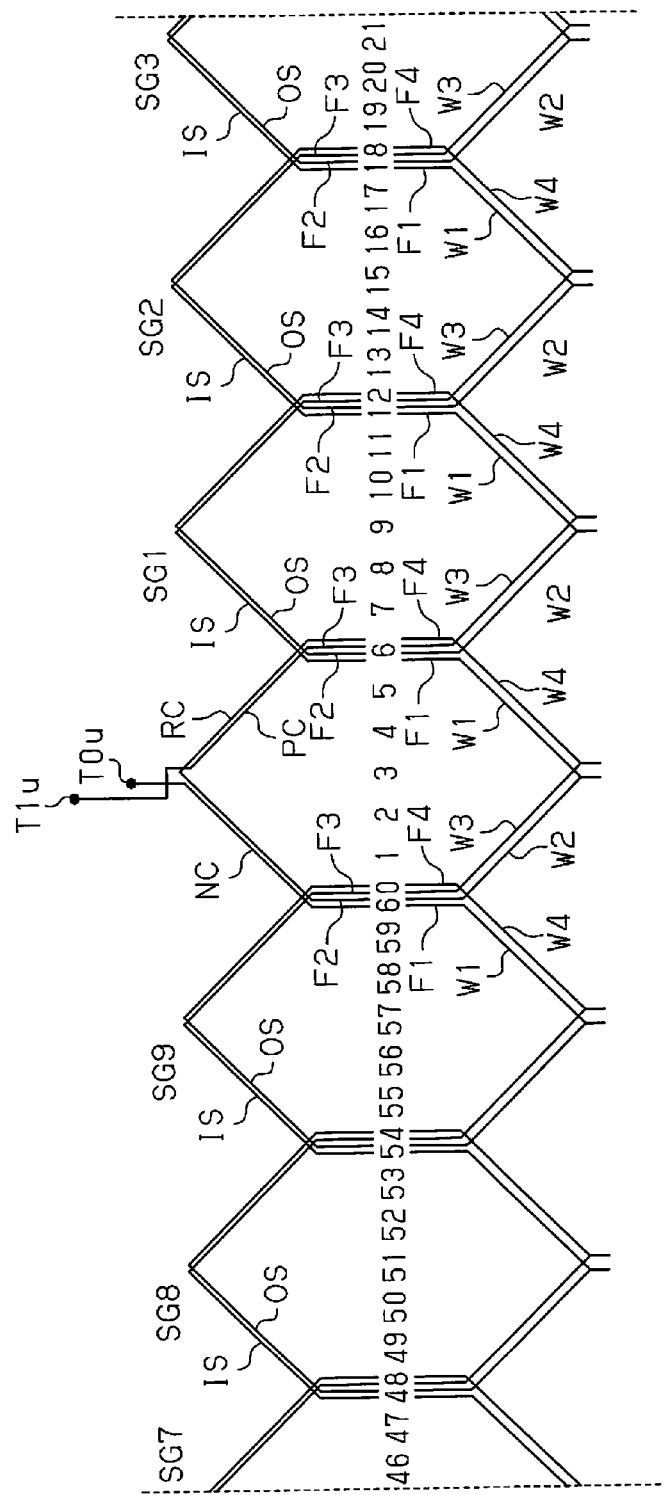
FIG. 10 is a developed view showing a portion of a coil of a U1 phase of a first system.
Figure 11:
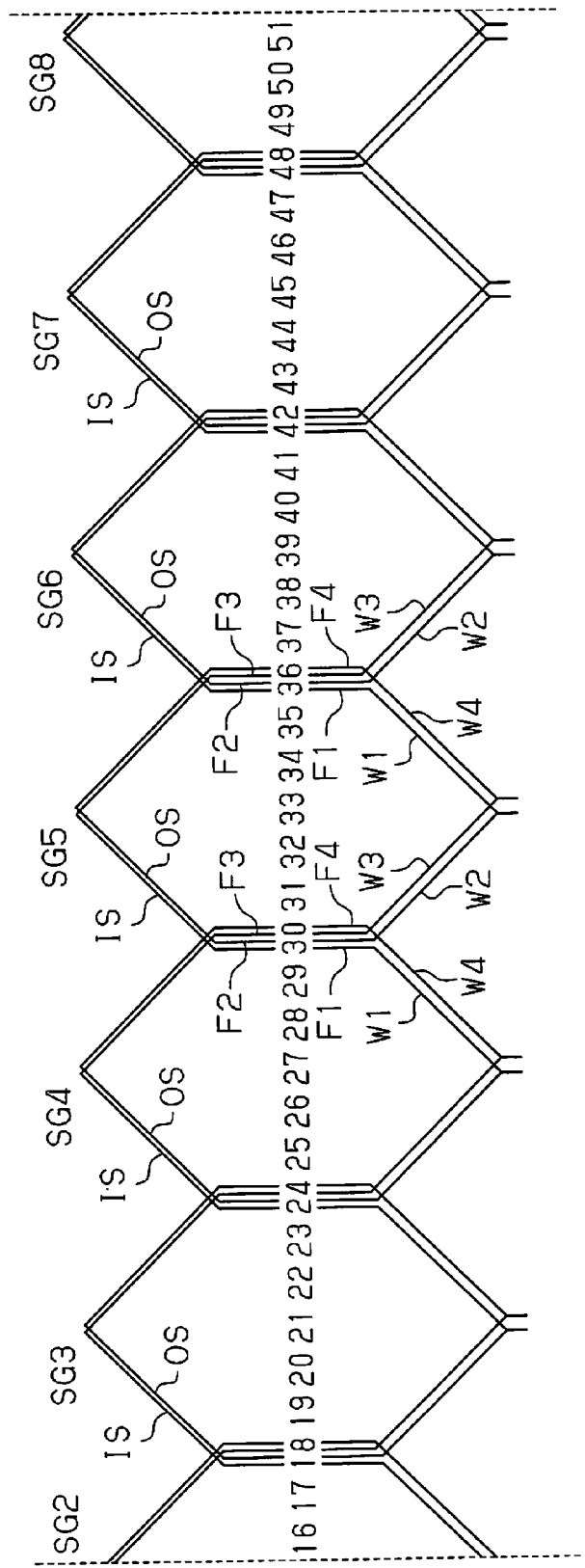
FIG. 11 is another developed view showing a portion of the coil of the U1 phase of the first system.

Then, by repeatedly performing the above-described steps, the coil of the U1 phase is formed as illustrated in FIGS. 10 and 11.

The other coils of the three phases of the first system, which are the coils of the V1 phase and the W1 phase, are mounted in the same manner as the coil of the U1 phase. The joint portions C of the common conductors NC of the respective phases at the rear side are referred to as neutral point terminals T0u, T0v, and T0w correspondingly. The joint portions C of the feeding conductors PC of the respective phases are referred to as electric power reception terminals T1u, T1v, and T1w correspondingly.

The neutral point terminals T0u, T0v, T0w are connected together to form a neutral point N1 (see FIG. 13) of a three phase Y connection. The electric power reception terminals T1u, T1v, T1w are electric power reception terminals for receiving electric power of the corresponding phases. As a result, the coils of the three phases of the first system with the three phase Y connection, which is configured by the electric circuit illustrated in FIG. 13, are formed.

Figure 13:
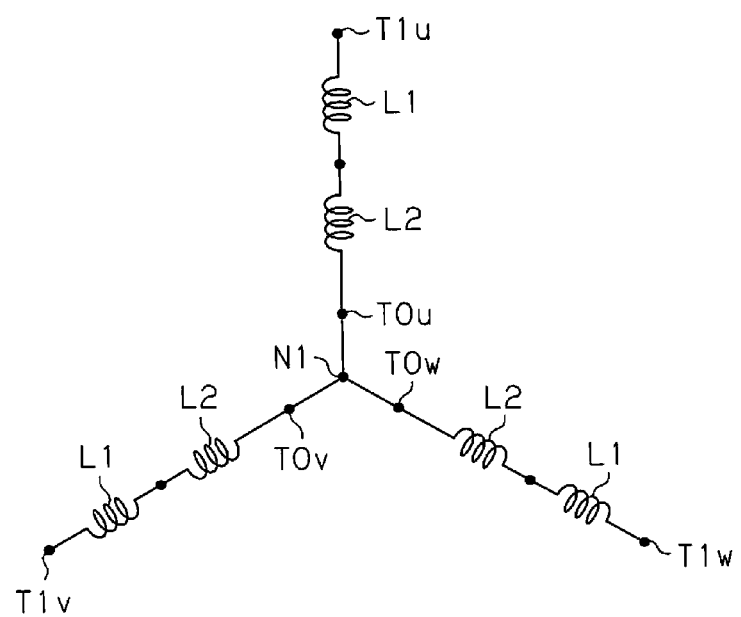
FIG. 13 is an electric circuit diagram showing three phase coils of the first system.

In FIG. 13, the three reference numerals L1 each represent inductance of the coil extending from the corresponding electric power reception terminal T1u, T1v, T1w to the inversion conductor RC. The three reference numerals L2 each represent inductance of the coil extending from the inversion conductor RC to the corresponding neutral point terminal T0u, T0v, T0w.

(Three Phase Coils of Second System)

The coils of the three phases of the second system will now be described.

The coils of the three phases of the second system form a three phase Y connection like the coils of the three phases of the first system. The winging wires of the three phases of the second system are mounted in the corresponding slots S located offset by one slot pitch from the slots S receiving the coils of the corresponding phases of the first system.

Figure 14:
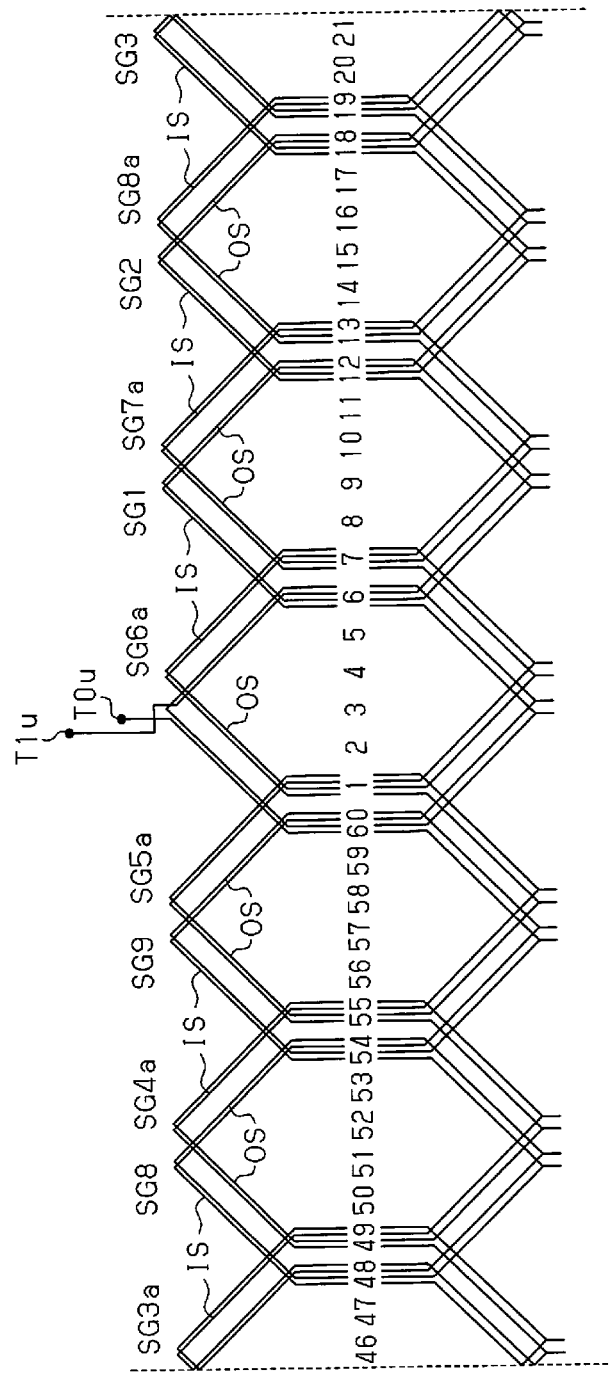
FIG. 14 is a developed view showing a portion of a coil of a U2 phase of a second system.
Figure 15:
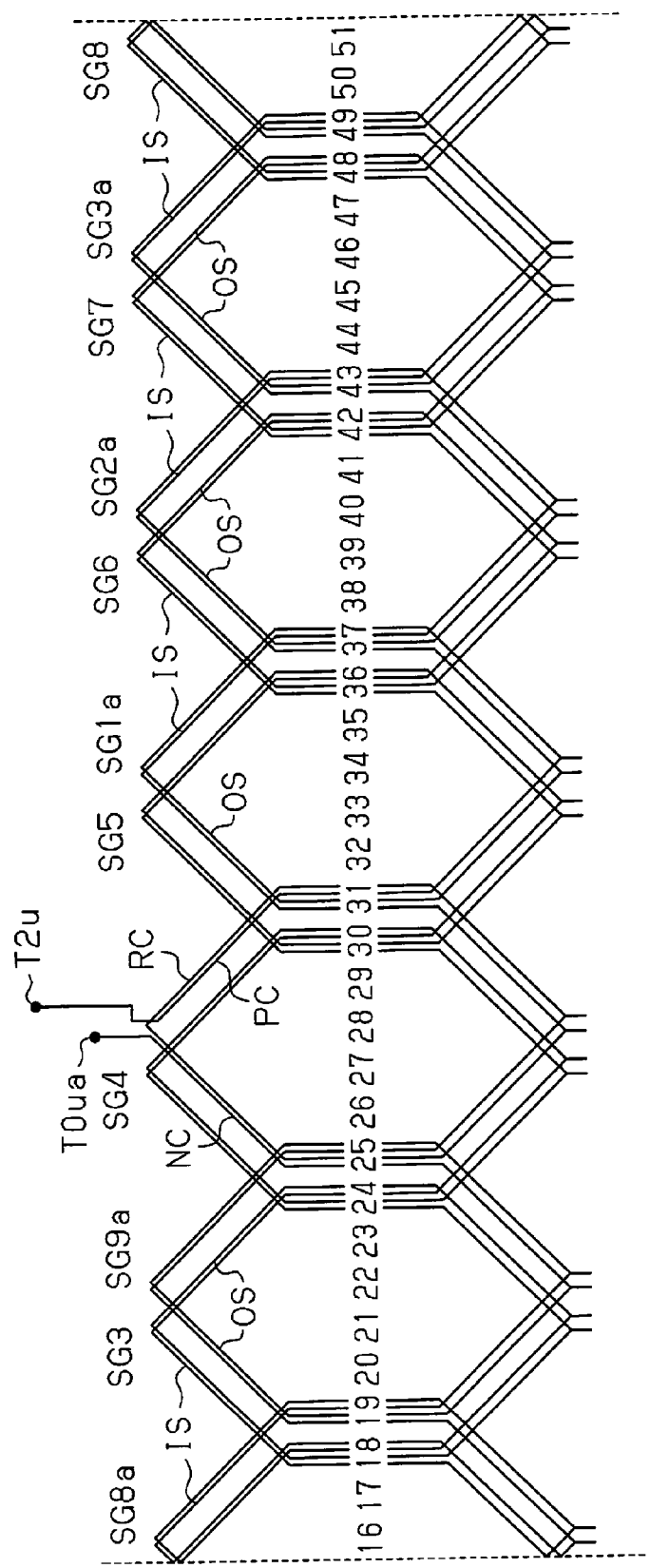
FIG. 15 is another developed view showing a portion of the coil of the U2 phase of the second system.

Accordingly, as illustrated in FIGS. 14 and 15, the coil of the U2 phase of the second system is mounted in the corresponding slot S located offset by one slot pitch from the corresponding coil of the U1 phase of the first system.

The slots S used for the coils of the U2 phase of the second system are the slots S with the corresponding ones of the slot numbers represented in Table 1. An inversion conductor RC, a feeding conductor PC, a common conductor NC, and nine coil segments SG1a to SG9a are employed.

The inversion conductor RC is inserted into the slots S with the slot numbers 25 and 31. The slot S having the slot number 25 also receives the common conductor NC and the slot S with the slot number 31 receives the feeding conductor PC.

A first coil segment SG1 a is inserted in the slots S of slot numbers 31 and 37. A second coil segment SG2a is received in the slots S of slot numbers 37 and 43. A third coil segment SG3a is mounted in the slots S of slot numbers 43 and 49. A fourth coil segment SG4a is received in the slots S of slot numbers 49 and 55.

A fifth coil segment SG5a is inserted in the slots S of slot numbers 55 and 1. A sixth coil segment SG6a is received in the slots S of slot numbers 1 and 7. A seventh coil segment SG7a is mounted in the slots S of slot numbers 7 and 13. An eighth coil segment SG8a is inserted in the slots S of slot numbers 13 and 19. A ninth coil segment SG9a is mounted in the slots S of slot numbers 19 and 25.

As in the case of the coil of the U1 phase of the first system, the coil segments SG1a to SG9a are connected together to form the coil of the U2 phase of the second system. The coils of the V2 phase and the W2 phase of the second system are mounted in the same manner as the coil of the U2 phase. The joint portions C of the common conductors NC of the respective phases at the rear side are neutral point terminals T0ua, T0va, T0wa. The joint portions C of the feeding conductors PC of the respective phases at the rear side are electric power reception terminals T2u, T2v, T2w.

The neutral point terminals T0ua, T0va, T0wa are connected to one another to form a neutral point N2 (see FIG. 16) of a three phase Y connection. The electric power reception terminals T2u, T2v, T2w form electric power reception terminals for receiving electric power of the corresponding phases. As a result, the coils of the three phases of the second system with the three phase Y connection, which is configured by the electric circuit illustrated in FIG. 16, is formed.

Figure 16:
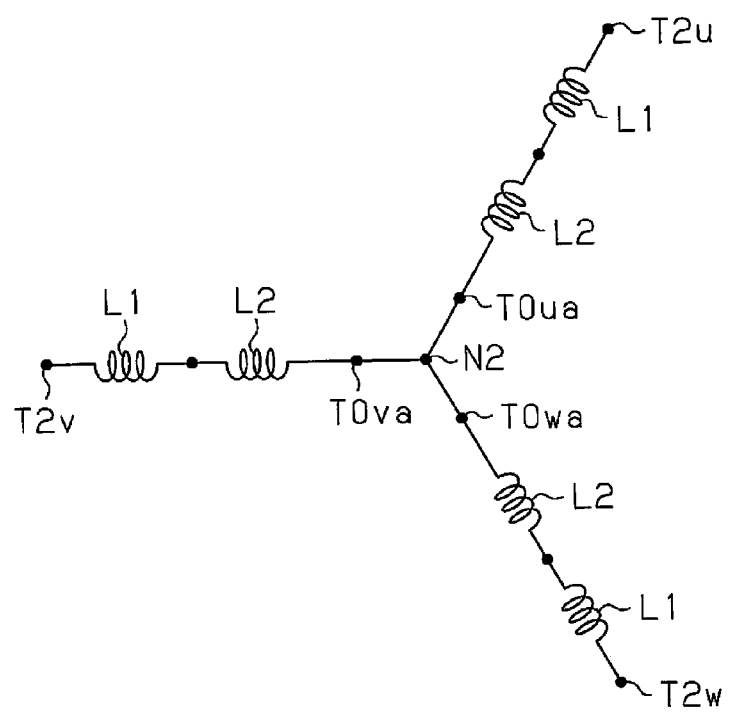
FIG. 16 is an electric circuit diagram illustrating three phase coils of the second system.

In FIG. 16, the three reference numerals L1 each represent inductance of the coil extending from the corresponding electric power reception terminal T2u, T2v, T2w to the inversion conductor RC. The three reference numerals L2 each represent inductance of the coil extending from the inversion conductor RC to the corresponding neutral point terminal T0ua, T0va, T0wa.

With reference to FIG. 1, a rotor 11 is arranged at the inner side of the stator 6 in which the coils of the three phases of the first system and the coils of the three phases of the second system are mounted in the above-described manner.

The rotor 11 is fixed to a rotary shaft 12. In the first embodiment, the rotary shaft 12 is a metal shaft formed of non-magnetic material, such as stainless steel, and rotationally supported through a bearing 14 and a bearing 15 held by a rear cover wall 3a of the tubular housing 3 and a front end plate 4, respectively. However, the rotary shaft 12 may be a metal shaft formed of magnetic material such as iron steel.

The rotor 11 fixed to the rotary shaft 12 is a rotor with a consequent pole type structure.

Figure 17:
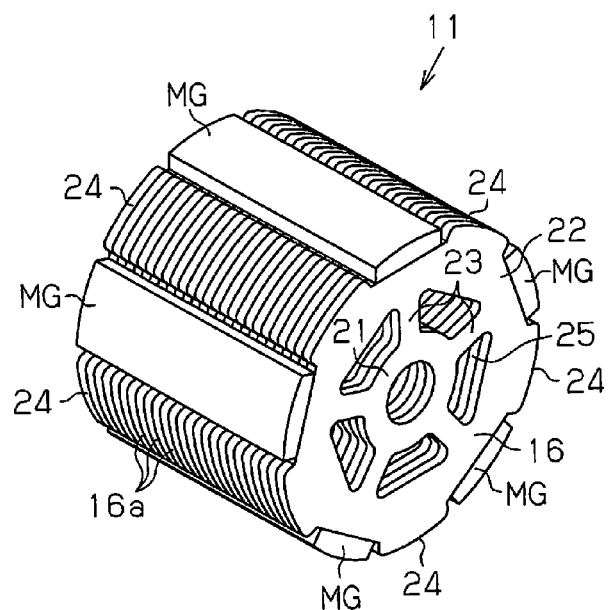
FIG. 17 is a perspective view showing a consequent pole type rotor.
Figure 18:
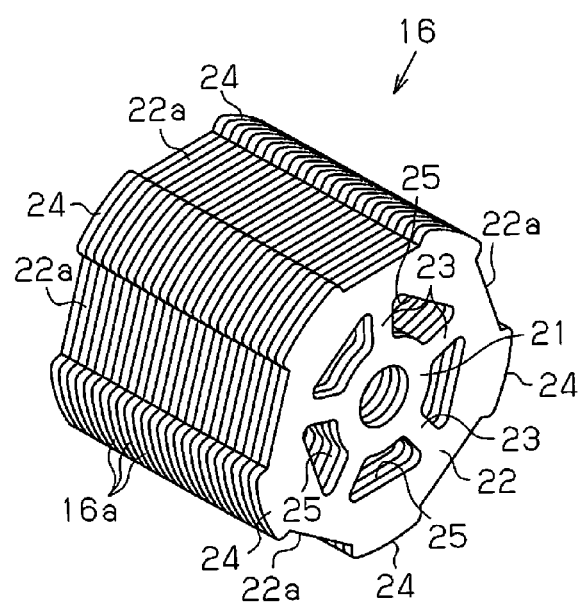
FIG. 18 is a perspective view showing a consequent pole type rotor core.

Referring to FIGS. 17 and 18, the rotor 11 has a rotor core 16, which is configured by laminating a plurality of rotor core pieces 16a formed by steel plates. The rotor 11 is fixed to the rotary shaft 12. The rotor core pieces 16a are obtained together with stator core pieces from the radially inner sides of the stator core pieces when the stator core pieces are formed through punching. The rotor core pieces 16a are laminated together to form the rotor core 16.

As illustrated in FIG. 18, the rotor core 16 has a shaft fixing tubular portion 21, a magnet fixing tubular portion 22, and five bridging portions 23. The shaft fixing tubular portion 21 is formed in a cylindrical shape and fixed to the rotary shaft 12. The magnet fixing tubular portion 22 is arranged around the outer peripheral surface portions of the shaft fixing tubular portion 21 with a certain interval between the shaft fixing tubular portion 21 and the magnet fixing tubular portion 22.

The bridging portions 23 join and hold the shaft fixing tubular portion 21 and the magnet fixing tubular portion 22 with the certain interval between the tubular portions 21 and 22.

Five arcuate recesses 22a are formed in the outer peripheral surface of the magnet fixing tubular portion 22 each in a dented shape toward the axis and spaced apart at equal circumferential angular intervals. The arcuate recesses 22a form five projections 24, each of which is located between the corresponding adjacent pair of the recesses 22a.

As illustrated in FIG. 17, a magnet MG is fixed in each of the five recesses 22a, which are arranged circumferentially. The five magnets MG are arranged such that the radially inner surface of each magnet MG forms a north pole and the surface radially closer to the stator 6 of the magnet MG forms a south pole with respect to the rotor core 16.

As a result, the outer surfaces (closer to the stator 6) of the projections 24, which are circumferentially adjacent to the corresponding magnets MG, are north poles, unlike the outer surfaces of the magnets MG.

In the first embodiment, the number Z of the teeth 9 in the stator 6 with respect to the rotor 11 is set in the manner described below.

Specifically, when the number (the number of pole pairs) is p (p is an integer greater than or equal to 2) and the number of the phases of the coils is m, the number Z of the teeth 9 is set to satisfy the following equation: Z=2×p×M×n (n is a natural number).

Figure 19:
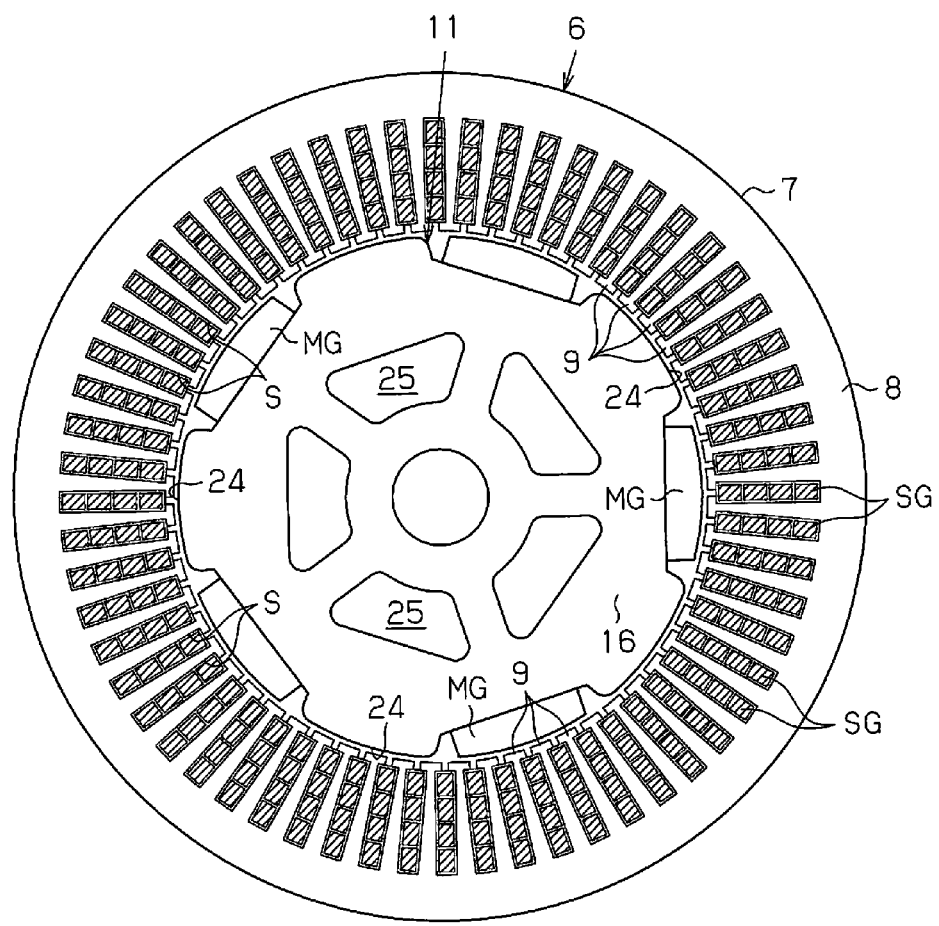
FIG. 19 is a front view showing a stator and a rotor as viewed in the axial direction.

In the first embodiment, referring to FIG. 19, the number Z of the teeth 9 is sixty and obtained using the aforementioned equation.

$$Z = 2 \times 5 \text{(the number of the magnets } MG) \times 3 \text{(the number of the phases)} \times 2 = 60$$

The bridging portions 23 are extended from the outer peripheral surface of the shaft fixing tubular portion 21 and connected to the inner peripheral surface of the magnet fixing tubular portion 22. The five bridging portions 23 are circumferentially spaced apart at equal intervals, extending in the axial direction.

Specifically, the bridging portions 23 are connected to the inner peripheral surface of the magnet fixing tubular portion 22 at the positions corresponding to the recesses 22a, in which the magnets MG are fixedly mounted. In this state, the radial midline of each bridging portion 23, which extends radially, is perpendicular to the midline of the circumferential width of the corresponding magnet MG.

As a result, the space between the outer peripheral surface of the shaft fixing tubular portion 21 and the inner peripheral surface of the magnet fixing tubular portion 22 are divided into five sections by the five bridging portions 23, which are arranged circumferentially. This configuration forms five clearances 25 (low-magnetic light-weight portions), which extends axially.

Each of the clearances 25 has low specific gravity and exhibits low magnetism compared to a rotor core material formed by laminated steel plates. As a result, the clearances 25 reduce the weight of the rotor core 16, thus decreasing the weight of the motor as a whole.

The bearing 14, which rotationally supports the rotary shaft 12, is supported in a bearing accommodating portion 31, which is formed in the rear cover wall 3a of the tubular housing 3. A through hole 32 is formed in the bottom surface of the bearing accommodating portion 31. The rear end of the rotary shaft 12 is thus projected from the through hole 32 through the rear cover wall 3a.

The bearing 15 at the front side, which rotationally supports the rotary shaft 12, is supported by a bearing accommodating portion 33 formed in the front end plate 4. A through hole 34 extends through the bottom surface of the bearing accommodating portion 33. The distal end of the rotary shaft 12 is projected from the through hole 34 through the front end plate 4.

The brushless motor 1 of the first embodiment is used in an apparatus such as an electric power steering apparatus. The rotary shaft 12 of the rotor 11 is connected to a non-illustrated decelerator. The rotary shaft 12 is thus connected to a target shaft serving as a drive target, such as a non-illustrated steering shaft, through the decelerator. The brushless motor 1 thus drives the target shaft, which is the steering shaft.

The accommodation box 5, which is fixed to the rear outer side of the tubular housing 3, accommodates a drive device 50. A circuit substrate 51 is mounted in the drive device 50 and includes a rotation sensor 52 for controlling rotation of the rotor 11, an ECU (electronic control unit) 53, and various types of circuit components such as first switching transistors Q1u, Q1v, Q1w, and second switching transistors Q2u, Q2v, Q2w.

The rotation sensor 52 is mounted on the circuit substrate 51 and opposed to the rotary shaft 12, which projects axially from the through hole 32 in the bearing accommodating portion 31 of the rear cover wall 3a. In the first embodiment, the rotation sensor 52 is configured by a Hall IC and detects the rotating angle of a detection magnet 52a, which is fixed to the corresponding axial end surface of the rotary shaft 12 and rotates integrally with the rotary shaft 12.

The ECU 53 has a microcomputer. The ECU 53 detects a current rotating angle and a current rotating speed of the brushless motor 1 based on a detection signal provided by the rotation sensor 52. The ECU 53 then calculates the timing for supplying electric power to the coils of the respective three phases of the first system and the second system.

The first switching transistors Q1u, Q1v, Q1w are each configured by a power MOS transistor, for example, and turned on and off based on a control signal provided by the ECU 53. By turning on and off the first switching transistors Q1u, Q1v, Q1w at predetermined timings, the first switching transistors Q1u, Q1v, Q1w are controlled to supply electric power to the coils of the respective three phases of the first system. This causes each of the coils of the three phases of the first system to generate a rotating magnetic field in the stator 6.

As viewed axially, the first switching transistors Q1u, Q1v, Q1w mounted on the circuit substrate 51 are arranged to face the electric power reception terminals T1u, T1v, T1w of the respective phases, which are formed in the coils of the three phases of the first system. Output terminals O1u, O1v, O1w for supplying electric power to the coils of the respective phases are connected to the corresponding first switching transistors Q1u, Q1v, Q1w on the first circuit substrate 51 and arranged at radially outer positions on the circuit substrate 51 facing the electric power reception terminals T1u, T1v, T1w, as viewed axially.

Extended wires L1u, L1v, L1w are extended out from the electric power reception terminals T1u, T1v, T1w of the corresponding phases and passed through first insertion holes 35 formed in the rear cover wall 3a. The extended wires L1u, L1v, L1w thus connect the electric power reception terminals T1u, T1v, T1w of the corresponding phases to the output terminals O1u, O1v, O1w of the phases by a minimum axial distance.

The second switching transistors Q2u, Q2v, Q2w are each configured by a power MOS transistor, for example, and turned on and off based on a control signal provided by the ECU 53. By turning on and off the second switching transistors Q2u, Q2v, Q2w at predetermined timings, the second switching transistors Q2u, Q2v, Q2w w are controlled to supply electric power to the coils of the corresponding three phases of the first system. This causes each of the coils of the three phases of the second system to generate a rotating magnetic field in the stator 6.

As viewed axially, the second switching transistors Q2u, Q2v, Q2w mounted on the circuit substrate 51 are arranged to face the electric power reception terminals T2u, T2v, T2w of the respective phases, which are formed in the coils of the three phases of the second system. Output terminals O2u, O2v, O2w for supplying electric power to the coils of the corresponding phases are connected to the corresponding second switching transistors Q2u, Q2v, Q2w on the first circuit substrate 51 and arranged at positions facing the electric power reception terminals T2u, T2v, T2w, as viewed axially.

Extended wires L2u, L2v, L2w are extended out from the electric power reception terminals T2u, T2v, T2w of the corresponding phases and passed through second insertion holes 36 formed in the rear cover wall 3a. The extended wires L2u, L2v, L2w thus connect the electric power reception terminals T2u, T2v, T2w of the corresponding phases to the output terminals O2u, O2v, O2w of the phases by a minimum axial distance.

Operation of the first embodiment, which has the above-described configuration, will now be described.

Each inner conductor IS and the corresponding outer conductor OS, which are identically shaped, are arranged such that the recesses Cd face each other. The wall of the recess Cd of the inner conductor IS and the opposing wall of the recess Cd of the outer conductor OS are engaged with each other, thus forming the coil segment SG before insertion into the corresponding slots S, as illustrated in FIG. 8A.

In this state, referring to FIG. 8A, the joint portions C of the inner conductor IS and the outer conductor OS are engaged and overlapped with each other. The first and third layer legs F1, F3 of the inner conductor IS are arranged linearly with the second and fourth layer legs F2, F4 of the outer conductor OS in a radial direction. In the coil segment SG configured in this manner, the joint portions C of the inner and outer conductors IS, OS are not overlapped with each other in the axial direction. As a result, the axial positions of the joint portions C of the inner and outer conductors IS, OS correspond to each other. The distal ends of the legs F of the inner and outer conductors IS, OS are also aligned.

Then, to insert the coil segment SG before insertion, which is illustrated in FIG. 8A, into the corresponding slots S such that the first and second layer legs F1, F2 become spaced from the third and fourth legs F3, F4 by the interval corresponding to the six slot pitches, the inner and outer conductors IS, OS are twisted using the restriction plate PL and the first and second holding jigs H1, H2, as shown in FIG. 9. This plastically deforms the joint portions C, the first and second layer legs F1, F2, and the third and fourth layer legs F3, F4. As a result, with reference to FIG. 8C, the interval between the first and second layer legs F1, F2 and the third and fourth layer legs F3, F4 of the coil segment SG is enlarged circumferentially to the size corresponding to the six slot pitches.

Subsequently, with the first and second layer legs F1, F2 spaced from the third and fourth layer legs F3, F4 by the interval corresponding to the six slot pitches, the first and second layer legs F1, F2 and the third and fourth layer legs F3, F4 are inserted into the corresponding slots S. When such insertion is carried out, the top T of the joint portion C of each of the inner and outer conductors IS, OS is maintained in contact with a flat surface of an axial positioning plate (which is, for example, the restriction plate PL illustrated in FIG. 9) extending perpendicular to the axial direction. This prevents variation in the heights of projection of the joint portions C of the inner and outer conductors IS, OS from the front side of the stator core 7, thus equalizing the heights. As a result, the positions of the distal ends of the legs F and the projecting amounts of the legs F from the rear side of the stator core 7 are also prevented from being varied. This brings about even dimensions of the legs F.

After each coil segment SG, which is formed by the inner conductor IS and the outer conductor OS, is inserted into the corresponding slots S, the portions of the inner conductor IS and the outer conductor OS projected from the slots S are bent in the coil segment SG. This forms the first to fourth welding portions W1 to W4 in the corresponding first to fourth layer legs F1 to F4.

Then, in the coil of the same phase, the third welding portion W3 and the fourth welding portion W4 of each circumferentially adjacent pair of the coil segments SG are welded together. The first welding portion W1 and the second welding portion W2 of each circumferentially adjacent pair of the coil segments SG are also welded together. As a result, the coils of the three phases are formed.

Further, the first to fourth welding portions W1 to W4 of the inversion conductors RC, the feeding conductors PC, and the common conductors NC, which are inserted into the corresponding slots together with the coils SG, are welded to the corresponding first to fourth welding portions W1 to W4. As a result, the stator 6 having the coils of the three phases of the two systems, which are formed by three phase Y connections, is formed.

Since the rotor 11 of the brushless motor 1 is a consequent pole type rotor, the number of the magnets MG attached to the rotor 11 is decreased by half. Also, since the coils of the three phases of the two systems are provided using the coil segments SG in the stator 6, the occupancy rate of the coil in each slot S is increased. Further, the number Z of the teeth 9 satisfies the equation: $Z=2 \times p \times m \times n=60$. That is, the number of the slots S per magnetic pole in the rotor 11 is great, thus decreasing cogging torque.

The first embodiment has the advantages described below.

(1) In the first embodiment, the joint portions C of the U-shaped inner and outer conductors IS, OS configuring each coil segment SG are overlapped with each other in a circumferential direction but not in the axial direction. In other words, the joint portions C are not laminated in the axial direction. This decreases the axial dimension of the coil segment SG by the amount corresponding to the non-overlapped, or non-laminated, portions of the joint portions C in the axial direction.

Also, when each coil segment SG is inserted in the corresponding slots S, the tops T of the joint portions C of the inner and outer conductors IS, OS are aligned with each other in the axial direction. This decreases the axial length of the stator 6, thus reducing the size of the brushless motor 1.

(2) In the first embodiment, the U-shaped inner and outer conductors IS, OS, which configure each coil segment SG, are shaped identically with each other. Accordingly, the coil segment SG is configured by the single type of components. This decreases the amount of wire material and greatly facilitates parts control.

Also, the inner and outer conductors IS, OS are shaped identically with the inversion conductors RC before the recesses Cd are formed. This makes it unnecessary to manufacture segments used specifically for the inversion conductors RC, thus facilitating parts control. Similarly, the feeding conductors PC and the common conductors NC are each formed in a shape defined by cutting the inversion conductor RC in half. It is thus unnecessary to manufacture segments specifically for the feeding conductors PC and the common conductors NC. The parts control is thus facilitated.

(3) In the first embodiment, the recess Cd is formed in the joint portion C of each of the U-shaped inner and outer conductors IS, OS. Accordingly, by engaging the walls of the recesses Cd of the joint portions C of the inner and outer conductors IS, OS with each other, the first layer leg F1 and the third layer leg F3 of the inner conductor IS are aligned linearly with the second layer leg F2 and the fourth layer leg F4 of the outer conductor OS in a radial direction.

(4) In the first embodiment, twisting is performed to set the interval between the first and second layer legs F1, F2 and the third and fourth layer legs F3, F4 of each coil segment SG to the size corresponding to the six slot pitches before the coil segment SG are inserted into the corresponding slots S.

As a result, the first and second layer legs F1, F2 and the third and fourth layer legs F3, F4 of each coil segment SG are smoothly inserted in the desired slots S. This facilitates insertion of the coil segments SG in the slots S.

Also, when each coil segment G is twisted, the tops T of the joint portions C of the inner and outer conductors IS, OS are held in contact with the restriction plate PL. Then, the coil segment SG is inserted by applying equal load toward the front side through the restriction plate PL with the tops T maintained at the same positions. This prevents variation in the axial lengths of the first to fourth layer legs F1 to F4 and thus equalizes the axial lengths of the legs F1 to F4.

Further, when each coil segment SG, which is configured in the above-described manner, is inserted into the corresponding slots S, an axially extending plate (the restriction plate PL) is held in contact with the tops T of the joint portions C. This prevents the amounts of projection of the joint portions C from the front side of the stator core 7, thus equalizing the heights of the joint portions C. Also, the positions of the distal ends of the legs F and the amounts of projection of the legs F from the rear side of the stator core 7 are prevented from being varied. This brings about even dimensions of the legs F.

(5) In the first embodiment, the clearances 25 are formed in the rotor 11, thus decreasing specific gravity and magnetism compared to a rotor core material formed by laminated steel plates. The rotor core 16 is thus reduced in weight and the weight of the brushless motor 1 as a whole is also decreased.

(6) In the first embodiment, the rotor 11 is configured as a consequent pole type rotor, thus decreasing the number of the magnets MG by half. Also, the number of the slots S in the stator 6 per magnetic pole in the rotor 11 is great. This decreases cogging torque.

(Second Embodiment)

A second embodiment of the present invention will now be described with reference to FIGS. 20 to 26.

In the first embodiment, each coil segment SG is configured by the inner conductor IS and the outer conductor OS, which are shaped identically with each other. In contrast, in the second embodiment, two conductors configuring each coil segment SG are shaped differently from each other. The second embodiment thus exhibits characteristics in the winding method of a coil formed by a three phase Y connection brought about by the different shapes of the conductors.

Accordingly, for illustrative purposes, the detailed description below is focused on different points in each coil segment SG and the winding method of the coil segments SG and does not include common points between the first and second embodiments.

Figure 20:
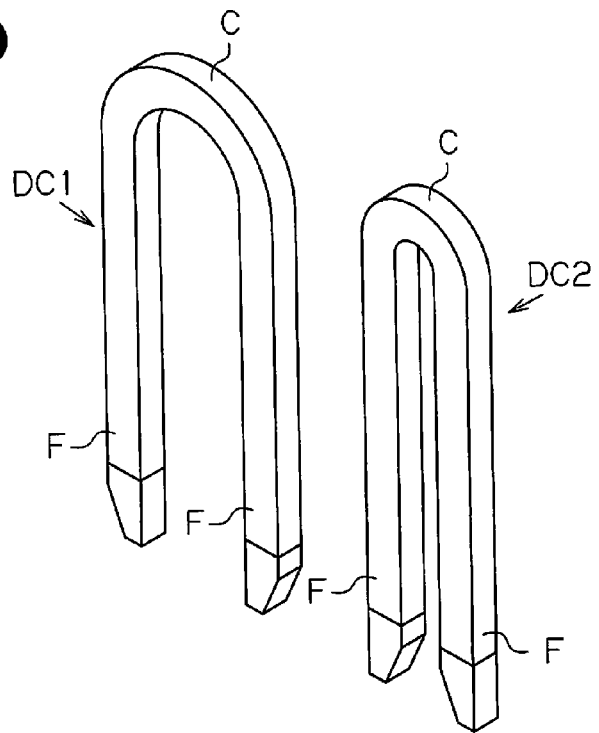
FIG. 20 is a perspective view showing a first conductor and a second conductor configuring a coil segment according to a second embodiment of the present invention.

With reference to FIG. 20, a first conductor DC1 and a second conductor DC2, which configure each coil segment SG, are U-shaped conductors each formed by bending a conductive wire having a predetermined length at a middle portion of the wire. The radial dimension of the first conductor DC1 is slightly greater than the radial dimension of the second conductor DC2.

Specifically, in each of the first conductor DC1 and the second conductor DC2, the arcuately bent portion corresponds to a joint portion C and the portions extending from the opposite ends of the joint portion C correspond to legs F. The joint portion C of the first conductor DC1 is shaped to be arranged at an outer side of the joint portion C of the second conductor DC2 in a radial direction. The two legs F of the first conductor DC1 are each shaped to be located at an outer side of the corresponding two legs F of the second conductor DC2 in a radial direction. The first conductor DC1 and the second conductor DC2 have substantially equal axial lengths. The tops T of the joint portions C and the pairs of the legs F are arranged at axially corresponding positions.

A method for manufacturing the coil segment SG using the first conductor DC1 and the second conductor DC2 will now be described.

Figure 21:
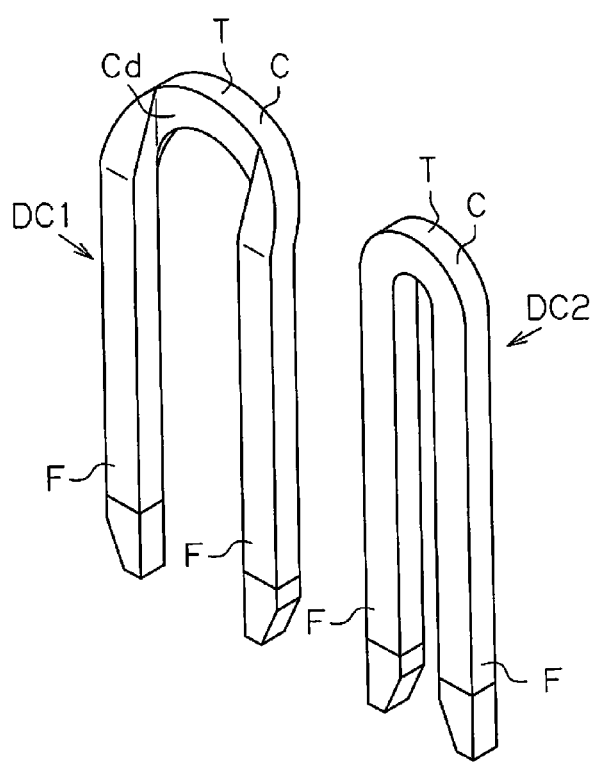
FIG. 21 is a perspective view illustrating the shape of a joint portion of the first conductor and the shape of a joint portion of the second conductor according to the second embodiment.

As illustrated in FIG. 21, a recess Cd is formed circumferentially in the joint portion C of the first conductor DC1. Specifically, as viewed circumferentially in a state where the first conductor DC1 and the second conductor DC2 are circumferentially overlaid with each other, the recess Cd is formed, using a press, in the portion of the joint portion C of the first conductor DC1 at which the joint portion C of the second conductor DC2 is overlaid. Alternatively, the recess Cd may be formed through compression. The depth of the recess Cd formed in the joint portion C of the first conductor DC1 is set to such a value that the bottom surface of the recess Cd is located at a depth substantially half of the circumferential thickness of each leg F and that the joint portion C of the second conductor DC2 can be engaged with the wall of the recess Cd.

The joint portion C of the second conductor DC2 is circumferentially bent as a whole with respect to the two legs F. Specifically, as illustrated in FIG. 21, the joint portion C is bent as a whole with respect to the two legs F in the opposite direction to the denting direction of the recess Cd formed in the joint portion C of the first conductor DC1. The joint portion C of the second conductor DC2 is bent to such an extent that the top T of the joint portion C before bending is located to reach a position substantially half the circumferential thickness of each leg F.

Figure 22:
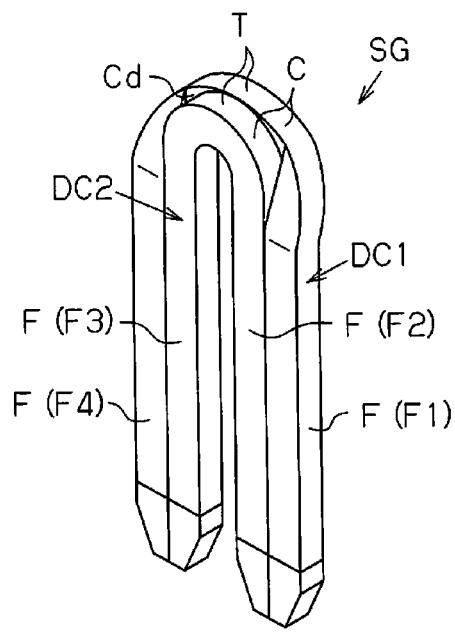
FIG. 22 is a perspective view showing a coil segment with the first conductor and the second conductor held in an overlaid state.

Then, the first conductor DC1 and the second conductor DC2 are arranged to face each other circumferentially. Specifically, the first conductor DC1 and the second conductor DC2 are opposed to each other such that the bending direction of the joint portion C of the second conductor DC2 corresponds to a direction toward the recess Cd of the first conductor DC1. Subsequently, the joint portion C of the second conductor DC2, which is formed through bending, is engaged with the wall of the recess Cd in the joint portion C of the first conductor DC1, thus forming the coil segment SG before insertion into the corresponding slots, as illustrated in FIG. 22.

The first conductor DC1 and the second conductor DC2 each have a surface coated with insulating material and are thus electrically insulated from each other.

In the above-described manner, the joint portions C of the first conductor DC1 and the second conductor DC2 become overlapped with each other and the two legs F of the first conductor DC1 are aligned linearly with the two legs F of the second conductor DC2 in a radial direction. The radially inner one of the legs F of the first conductor DC1 is a first layer leg F1 and the radially outer one of the legs F of the first conductor DC1 is a fourth layer leg F4. The radially inner one of the legs F of the second conductor DC2 is a second layer leg F2 and the radially outer one of the legs F of the second conductor DC2 is a third layer leg F3.

The joint portions C of the first and second conductors DC1, DC2 are not overlapped with each other in the axial direction when engaged with each other. As a result, the axial positions of the joint portions C of the first and second conductors DC1, DC2 are aligned with each other, and the axial positions of the distal ends of the first to fourth layer legs F1 to F4 of the first and second conductors DC1, DC2 are aligned with one another.

After having been formed using the first and second conductors DC1, DC2 in the above-described manner, each coil segment SG is inserted into the corresponding slots S under the conditions represented in Table 1, as in the case of the first embodiment. Inversion conductors RCa, feeding conductors PCa, and common conductors NC1 (see FIGS. 25 and 26) are inserted into corresponding slots S to satisfy the conditions in Table 1, as in the same manner as the first embodiment.

Specifically, the set of the first and second layer legs F1, F2 and the set of the third and fourth layer legs F3, F4 must be spaced from each other by the interval corresponding to the sixth slot pitches when inserted in the corresponding slots S. For this purpose, twisting is performed on the coil segment SG, which is configured by the first and second conductors DC1, DC2, as illustrated in FIG. 22.

As in the case of the first embodiment, twisting is carried out using the restriction plate PL and the first and second holding jigs H1, H2, referring to FIG. 9.

Figure 23:
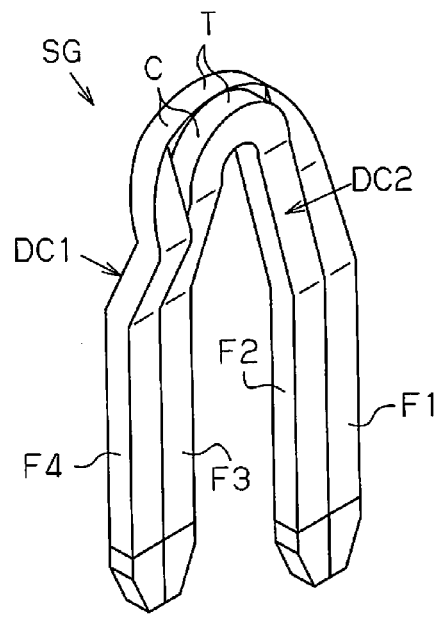
FIG. 23 is a view illustrating the first conductor and the second conductor after the coil segment is twisted.

Through such twisting, the joint portions C, the first and second layer legs F1, F2, and the third and fourth layer legs F3, F4 are deformed such that the circumferential interval between the set of the first and second layer legs F1, F2 and the set of the third and fourth layer legs F3, F4 becomes the size corresponding to the six slot pitches, as illustrated in FIG. 23. At this stage, referring to FIG. 23, twisting is carried out such that the first layer leg F1 and the second layer leg F2 are aligned linearly with each other in a radial direction and that the third layer leg F3 and the fourth layer leg F4 are located linearly with each other in a radial direction.

With the set of the first and second layer legs F1, F2 spaced from the set of the third and fourth layer legs F3, F4 at the interval corresponding to the six slot pitches, the legs F1 to F4 are inserted into the corresponding slots S (an inserting step). Specifically, twisting and insertion into the corresponding slots S are performed with load applied to the tops T of the joint portions C of the first and second conductors DC1, DC2 through the restriction plate PL in the inserting direction. This equalizes the heights of the coil ends of the joint portions C of the first and second conductors DC1, DC2.

Each of the inversion conductors RCa is a U-shaped conductor formed by bending a conductive wire having a predetermined length in an arcuate shape about a middle portion of the wire. The arcuately bent portion corresponds to a joint portion and the portions extending from the opposite ends of the joint portion correspond to legs. The two legs of each inversion conductor RCa correspond to the second layer leg F2 and the fourth layer leg F4.

Each of the feeding conductors PCa has a shape defined by cutting the U-shaped inversion conductor RCa by half at the joint portion. The feeding conductor PCa has a single leg corresponding to the third layer leg F3.

Each of the common conductors NCa also has a shape defined by cutting the U-shaped inversion conductor RCa by half at the joint portion. The common conductor NCa has a single leg corresponding to the first layer leg F1.

The coil segments SG, the inversion conductors RCa, the feeding conductors PCa, and the common conductors NCa are inserted into the corresponding slots S under the above-described conditions. As a result, in each of the slots S, the first layer leg F1, the second layer leg F2, the third layer leg F3, and the fourth layer leg F4 are arranged consecutively from the radially inner side in a four layer structure (a radially laminated structure), as illustrated in FIG. 12, like the first embodiment. The coil segments SG, the inversion conductors RCa, the feeding conductors PCa, and the common conductors NCa inserted in the slots S are then bent to form the coils of the respective phases.

Figure 24:
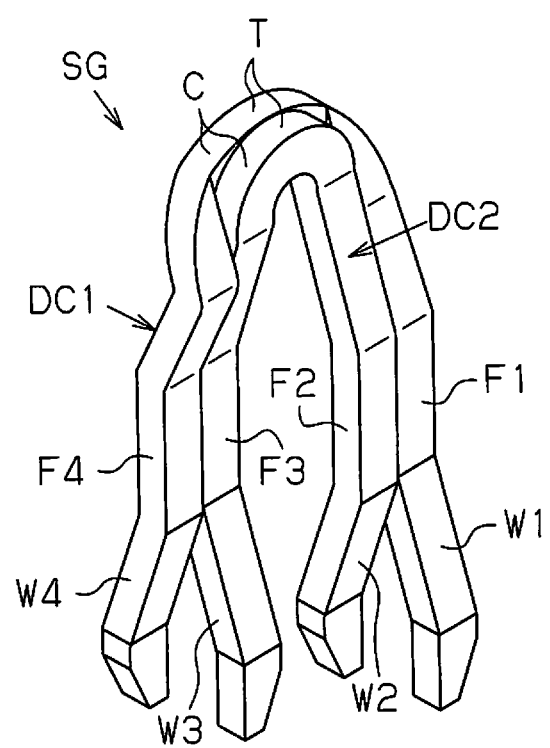
FIG. 24 is a perspective view showing the first conductor and the second conductor configuring the coil segment each in a bent state.
Figure 25:
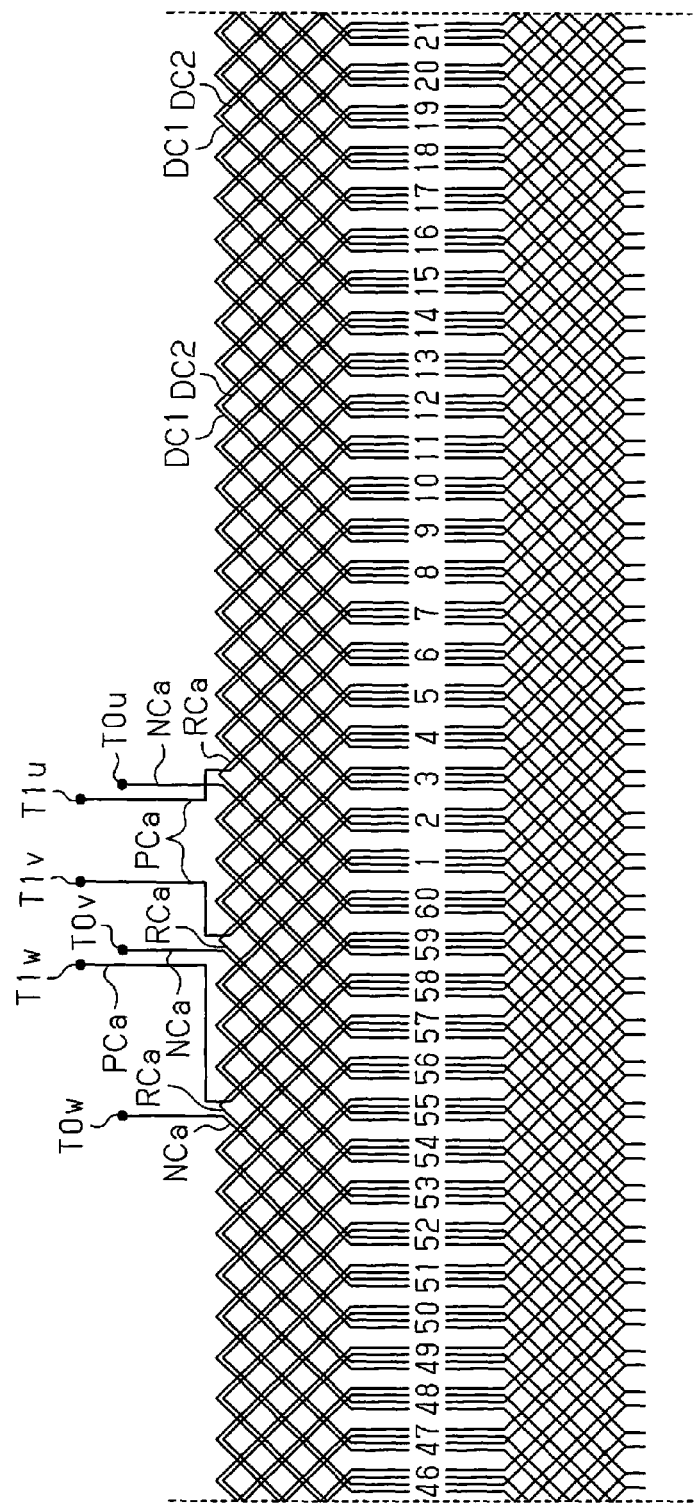
FIG. 25 is a developed view showing portions of three phase coils of the second embodiment.
Figure 26:
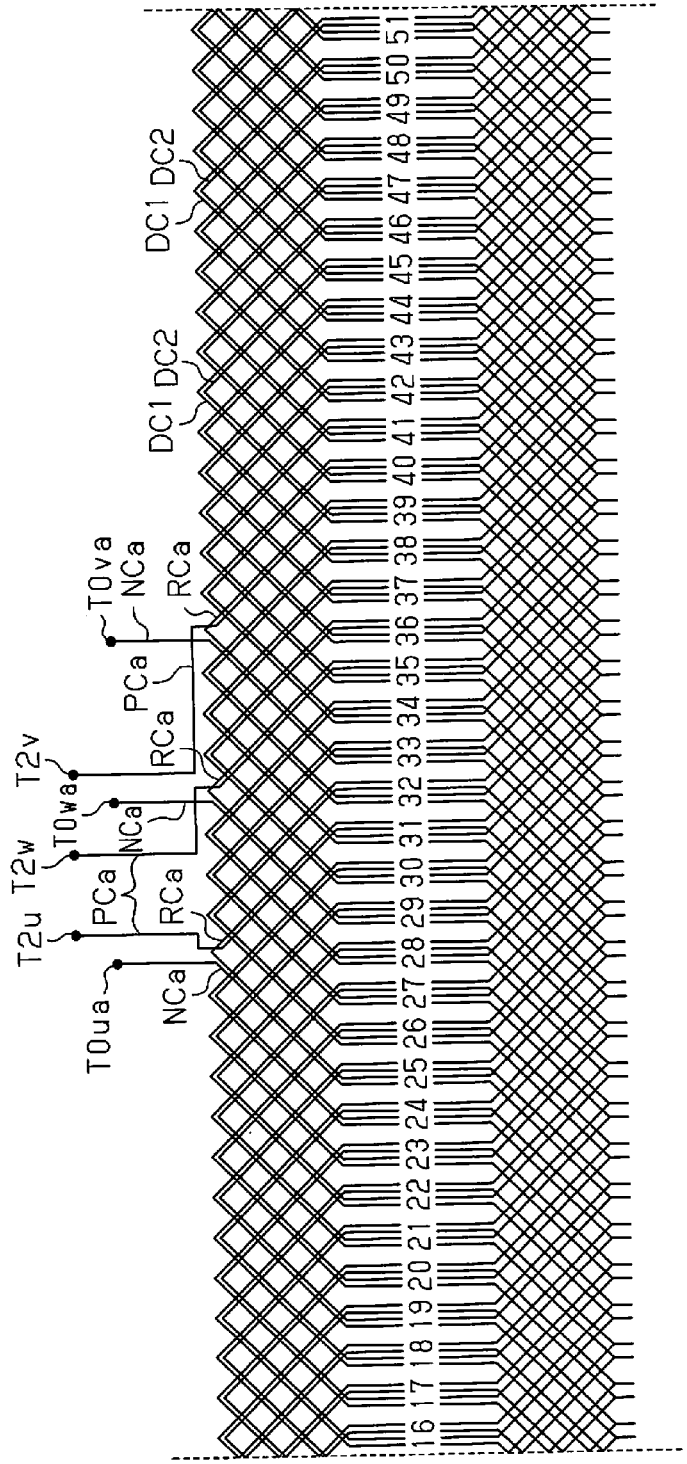
FIG. 26 is another developed view showing the portions of the three phase coils of the second embodiment.

Specifically, the first conductor DC1 and the second conductor DC2 of each coil segment SG are bent as illustrated in FIG. 24.

In other words, referring to FIG. 24, the first conductor DC1 is bent in directions to separate the portion of the first layer leg F1 projected from the corresponding slot S from the portion of the fourth layer leg F4 projected from the corresponding slot S. The portion of the first layer leg F1 and the portion of the fourth layer leg F1 of the first conductor DC1 that are projected from the corresponding slots S and bent away from each other are referred to as a first welding portion W1 and a fourth welding portion W4, respectively.

In contrast, referring to FIG. 24, the second conductor DC2 is bent in directions to bring the portion of the second layer leg F2 projected from the corresponding slot S closer to the portion of the third layer leg F3 projected from the corresponding slot S. The portion of the second layer leg F2 and the portion of the third layer leg F3 of the second conductor DC2 that are projected from the corresponding slots S and bent to be closer to each other are referred to as a second welding portion W2 and a third welding portion W3, respectively.

In the coil of each phase, the third welding portion W3 and the fourth welding portion W4 of each circumferentially adjacent pair of the coil segments SG are welded together. The first welding portion W1 and the second welding portion W2 of each circumferentially adjacent pair of the coil segments SG are welded to each other.

The welding portion (corresponding to the second welding portion W2) of the leg of each inversion conductor RCa corresponding to the second layer leg F2 is welded to the first welding portion W1 of the adjacent one of the coil segments SG. The welding portion (corresponding to the fourth welding portion W4) of the leg of the inversion conductor RCa corresponding to the fourth layer leg F4 is welded to the third welding portion W3 of the adjacent one of the coil segments SG.

The joint portions of the common conductors NCa at the rear side are neutral point terminals T0$u$ to T0$w$ and T0$ua$ to T0$wa$ of the three phases. The joint portions of the feeding conductors PCa at the rear side are electric power reception terminals T1$u$ to T1$w$ and T2$u$ to T2$w$. As a result, the stator 6 is formed by the coils of the three phases of the two systems configured by the three phase Y connections illustrated in FIGS. 25 and 26.

Operation of the second embodiment, which has the above-described configuration, will hereafter be described.

By opposing the first conductor DC1 and the second conductor DC2 to each other and engaging the joint portion C of the second conductor DC2 with the wall of the recess Cd of the first conductor DC1, the coil segment SG before insertion into the corresponding slots S is formed as illustrated in FIG. 23.

At this stage, referring to FIG. 23, the joint portions C of the first conductor DC1 and the second conductor DC2 are overlapped with each other. The first layer leg F1 and the fourth layer leg F4 of the first conductor DC1 are aligned linearly with the second layer leg F2 and the third layer leg F3 of the second conductor DC2, respectively, in a radial direction. In the coil segment SG formed in this manner, the joint portions C of the first and second conductors DC1, DC2 are not overlapped with each other in the axial direction. As a result, the axial positions of the joint portions C of the first and second conductors DC1, DC2 are aligned with each other. Also, the axial positions of the legs F of the first and second conductors DC1, DC2 are aligned with one another.

Subsequently, the coil segment SG before insertion illustrated in FIG. 23 is twisted using the restriction plate PL and the first and second holding jigs H1, H2, as illustrated in FIG. 9, such that the first and second layer legs F1, F2 become spaced from the third and fourth layer legs F3, F4 by the interval corresponding to the six slot pitches when inserted in the corresponding slots S. Through such twisting, the joint portions C, the first and second layer legs F1, F2, and the third and fourth layer legs F3, F4 are plastically deformed. As a result, referring to FIG. 24, the first and second layer legs F1, F2 are spaced circumferentially from the third and fourth layer legs F3, F4 in the coil segment SG by the interval corresponding to the six slot pitches.

Then, with the first and second layer legs F1, F2 spaced from the third and fourth layer legs F3, F4 by the interval corresponding to the six slot pitches, the first and second layer legs F1, F2 and the third and fourth layer legs F3, F4 are inserted into the corresponding slots S. In such insertion, the tops T of the joint portions C of the first and second conductors DC1, DC2 are maintained in contact with a flat surface of an axial positioning plate (which is, for example, the restriction plate PL shown in FIG. 9) extending perpendicular to the axial direction. This prevents variation in the amounts of projection of the joint portions C of the first and second conductors DC1, DC2 from the front side of the stator core 7, thus equalizing the heights of the joint portions C. The positions of the distal ends of the legs F and the amounts of projection of the legs F from the rear side of the stator core 7 are also prevented from being varied. This brings about even dimensions of the legs F.

After each coil segment SG configured by the first conductor DC1 and the second conductor DC2 is inserted in the corresponding slots S, the portions of the first and second conductors DC1, DC2 projected from the slots S are bent in the coil segment SG. This forms the first to fourth welding portions W1 to W4 in the corresponding first to fourth layer legs F1 to F4.

Then, in the coil of each phase, the third welding portion W3 and the fourth welding portion W4 of each circumferentially adjacent pair of the coil segments SG are welded together. The first welding portion W1 and the second welding portion W2 of each circumferentially adjacent pair of the coil segments SG are also welded to each other. As a result, the coils of the three phases are formed.

Further, the first to fourth welding portions W1 to W4 of the inversion conductors RCa, the feeding conductors PCa, and the common conductors NCa, which are inserted together with the coil segments SG, are welded to the corresponding first to fourth welding portions W1 to W4. As a result, the stator 6 is formed by the coils of the three phases of the two systems configured by the three phase Y connections.

The second embodiment has the advantages described below.

(1) In the second embodiment, the joint portions C of the U-shaped first and second conductors DC1, DC2, which configure the coil segment SG, are overlapped circumferentially but not in the axial direction. In other words, the joint portions C are not laminated in the axial direction. This decreases the axial length of the coil segment SG by the amount corresponding to the non-overlapped, or non-laminated, portions of the joint portions C in the axial direction.

Further, when each coil segment SG is inserted in the corresponding slots S, the tops T of the joint portions C of the first and second conductors DC1, DC2 are aligned in the axial direction. This reduces the axial length of the stator 6 and decreases the size of the brushless motor 1.

(2) In the second embodiment, each coil segment SG is twisted such that the first and second layer legs F1, F2 are spaced from the third and fourth layer legs F3, F4 by the interval corresponding to the six slot pitches before the coil segment SG is inserted into the corresponding slots S.

This allows smooth insertion of the first and second layer legs F1, F2 and the third and fourth layer legs F3, F4 of the coil segment SG in the desired slots S, thus facilitating such insertion.

When each coil segment SG is twisted, the tops T of the joint portions C of the first and second conductors DC1, DC2 are held in contact with the restriction plate PL. Then, the coil segment SG is inserted by applying equal load toward the front side through the restriction plate PL with the tops C maintained at the same positions. This prevents variation in the axial lengths of the first to fourth layer legs F1 to F4 and thus equalizes the axial lengths of the legs F1 to F4.

Further, when each coil segment SG, which is configured in the above-described manner, is inserted into the corresponding slots S, an axially extending plate (the restriction plate PL) is held in contact with the tops T of the joint portions C. This prevents the amounts of projection of the joint portions C from the front side of the stator core 7, thus equalizing the heights of the joint portions C. Also, the positions of the distal ends of the legs F and the amounts of projection of the legs F from the rear side of the stator core 7 are prevented from being varied. This brings about the same dimensions of the legs F.

(3) In the second embodiment, the second conductor DC2 is sized slightly smaller than the first conductor DC1. This decreases the wire material necessary for manufacturing the second conductor DC2.

(4) In the second embodiment, the clearances 25 formed in the rotor 11 decrease specific gravity and magnetism compared to a rotor core material formed by laminated steel plates. This reduces the weight of the rotor core 16, thus decreasing the weight of the brushless motor 1 as a whole.

(5) In the second embodiment, the rotor 11 is configured by a consequent pole type rotor, thus decreasing the number of the magnets MG by half. Also, the number of the slots S in the stator 6 per magnetic pole of the rotor 11 is increased, thus decreasing cogging torque.

The illustrated embodiments may be modified to the forms described below.

In the first embodiment, the tops T of the joint portions C of the inner conductor IS and the outer conductor OS are aligned in the axial direction. In the second embodiment, the tops T of the joint portions C of the first conductor DC1 and the second conductor DC2 are aligned in the axial direction. However, the present invention is not restricted to these configurations. That is, as long as the joint portions C are overlapped with each other in a radial direction, the tops T of the joint portions C do not necessarily have to be aligned in the axial direction.

Although each of the illustrated embodiments has sixty slots S, the invention is not restricted to this. For example, the number of the slots S may be changed as needed to any suitable value, which is, for example, 45.

Although the rotor 11 of each of the illustrated embodiments has the clearances 25, the invention may be used in a rotor without a clearance 25.

Although each of the illustrated embodiments includes five magnets MG, the number of the magnets MG is not restricted to this and may be changed to two or three or more. The number of the slots S formed in the stator may also be changed to any suitable value as needed.

In the illustrated embodiments, the stator 6 includes the first to fourth layer legs F1 to F4, which are a total of four layer legs inserted radially. However, a stator having two or three sets of first to fourth layer legs F1 to F4, which are eight or twelve layer legs inserted radially, may be employed.

In the illustrated embodiments, the stator 6 is configured by the SC coils each formed by the inserted coil segments SG. However, the present invention may be used in a stator configured by winding a coil formed of, for example, copper.

Although the brushless motor 1 is employed as the motor in the illustrated embodiment, the motor may be a type having brushes.

In the illustrated embodiment, the consequent pole type rotor 11 is an SPM (Surface Permanent Magnet Motor) type. However, the rotor 11 may be an IPM (Interior Permanent Magnet Motor) type rotor.

The invention claimed is:

1. A stator comprising:
a core having a cylindrical portion, a plurality of teeth, and an axis, the teeth being extended from the cylindrical portion toward the axis and spaced apart at equal intervals in a circumferential direction of the cylindrical portion, a plurality of slots each being formed between an adjacent pair of the teeth and extending in the axial direction defined by the axis, the core having a first end at one end in the axial direction and a second end at the opposite end; and
a plurality of U-shaped conductors each having a pair of legs and a joint portion for joining the legs together, the pair of legs being inserted in different ones of the slots of the core while being spaced apart at a predetermined slot pitch and a radial pitch, wherein
each slot receives four legs, each of the four legs being one leg of the corresponding one of the conductors, the four legs inserted in the slot being arranged in a laminated structure in which the legs are a first layer leg, a second layer leg, a third layer leg, and a fourth layer leg located consecutively from a radially inner side, the joint portions of the conductors being located at the side corresponding to the first end of the core, the distal ends of the legs of the conductors being arranged at the side corresponding to the second end of the core,
two of the four conductors corresponding to the legs inserted in one of the slots are overlapped with each other at the joint portions as viewed at least in the circumferential direction, and
at least one of the two conductors that are overlapped with each other in the circumferential direction has a recess recessed in the circumferential direction at the joint portion, and the recess is engaged with the joint portion of the other one of the two conductors.

2. The stator according to claim 1, wherein the different ones of the slots receive two of the conductors, tops of the joint portions of the two conductors being arranged at the same height.

3. The stator according to claim 1, wherein the two legs of one of the two conductors are the first layer leg and the third layer leg, and the two legs of the other one of the two conductors are the second layer leg and the fourth layer leg.

4. The stator according to claim 1, wherein the two legs of one of the two conductors are the first layer leg and the fourth layer leg, and the two legs of the other one of the two conductors are the second layer leg and the third layer leg.

5. A motor comprising a stator,
the stator including:
a core having a cylindrical portion, a plurality of teeth, and an axis, the teeth being extended from the cylindrical portion toward the axis and spaced apart at equal intervals in a circumferential direction of the cylindrical portion, a plurality of slots each being formed between an adjacent pair of the teeth and extending in the axial direction defined by the axis, the core having a first end at one end in the axial direction and a second end at the opposite end; and
a plurality of U-shaped conductors each having a pair of legs and a joint portion for joining the legs together, the pair of legs being inserted in different ones of the slots of the core while being spaced apart at a predetermined slot pitch and a radial pitch, wherein
each slot receives four legs, each of the four legs being one leg of the corresponding one of the conductors, the four legs inserted in the slot being arranged in a laminated structure in which the legs are a first layer leg, a second layer leg, a third layer leg, and a fourth layer leg located consecutively from a radially inner side, the joint portions of the conductors being located at the side corresponding to the first end of the core, the distal ends of the legs of the conductors being arranged at the side corresponding to the second end of the core,
two of the four conductors corresponding to the legs inserted in one of the slots are overlapped with each other at the joint portions as viewed at least in the circumferential direction, and
at least one of the two conductors that are overlapped with each other in the circumferential direction has a recess recessed in the circumferential direction at the joint portion, and the recess is engaged with the joint portion of the other one of the two conductors.

6. The motor according to claim 5, wherein the different ones of the slots receive two of the conductors, tops of the joint portions of the two conductors being arranged at the same height.

7. The motor according to claim 5, wherein the two legs of one of the two conductors are the first layer leg and the third layer leg, and the two legs of the other one of the two conductors are the second layer leg and the fourth layer leg.

8. The motor according to claim 5, wherein the two legs of one of the two conductors are the first layer leg and the fourth layer leg, and the two legs of the other one of the two conductors are the second layer leg and the third layer leg.

9. The motor according to claim 5, wherein a rotor mounted at an inner side of the stator is a consequent pole type rotor.

10. The motor according to claim 5, wherein a rotor mounted at an inner side of the stator is a consequent pole type rotor, and a low-magnetic light-weight portion having a smaller specific gravity and a lower magnetism than a rotor core material is arranged at a radial position in a rotor core of the rotor.

* * * * *